(12) United States Patent
Kushiro

(10) Patent No.: US 8,718,873 B2
(45) Date of Patent: May 6, 2014

(54) ELECTRIC POWER STEERING DEVICE

(75) Inventor: Ikuo Kushiro, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 620 days.

(21) Appl. No.: 12/672,328

(22) PCT Filed: Aug. 6, 2008

(86) PCT No.: PCT/JP2008/064498
§ 371 (c)(1),
(2), (4) Date: Feb. 5, 2010

(87) PCT Pub. No.: WO2009/020233
PCT Pub. Date: Feb. 12, 2009

(65) Prior Publication Data
US 2010/0211262 A1    Aug. 19, 2010

(30) Foreign Application Priority Data
Aug. 8, 2007    (JP) ................................ 2007-206797

(51) Int. Cl.
*A01B 69/00*    (2006.01)

(52) U.S. Cl.
USPC ............................................. 701/41; 701/42

(58) Field of Classification Search
USPC .................................................... 701/41, 42
See application file for complete search history.

(56) References Cited

U.S. PATENT DOCUMENTS

| | | | | |
|---|---|---|---|---|
| 7,275,617 B2 * | 10/2007 | Endo et al. | .................... | 180/402 |
| 2004/0148080 A1 * | 7/2004 | Ekmark et al. | .................. | 701/41 |

FOREIGN PATENT DOCUMENTS

| | | | |
|---|---|---|---|
| DE | 103 48 792 B3 | 5/2005 | |
| DE | 698 24 911 T2 | 8/2005 | |
| DE | 699 32 492 T2 | 1/2007 | |
| EP | 1 798 132 A1 | 6/2007 | |
| EP | 1 839 998 A1 | 10/2007 | |
| JP | 2002 274404 | 9/2002 | |
| JP | 2003 306158 | 10/2003 | |
| JP | 2003306158 | * 10/2003 | ............... B62D 6/00 |
| JP | 2005 88754 | 4/2005 | |
| JP | 2006 15796 | 1/2006 | |
| JP | 2006 182052 | 7/2006 | |
| JP | 2006 315617 | 11/2006 | |

OTHER PUBLICATIONS

Office Action issued Mar. 21, 2011, in German Patent Application No. 11 2008 002 150.3-21 with English translation.

* cited by examiner

*Primary Examiner* — Ramsey Refai
(74) *Attorney, Agent, or Firm* — Oblon, Spivak, McClelland, Maier & Neustadt, L.L.P.

(57) ABSTRACT

An object of the present invention is to provide an electric power steering device which reduces the variation of viscous feeling due to the change of steering velocity and presents better steering feeling than conventional power steering devices. A basic assist torque Tab and the like are calculated; filter parameters such as time constant $T_n$ are calculated; and a gain $G_s$ is calculated. A steering velocity s·θ is calculated and a correction torque $T_{cmps}$ is calculated as a product of a gain $G_s$ and a value obtained by filtering steering velocity s·θ with a filter of second-order lag and first-order advance. Further, a final target assist torque Ta is calculated by summing a basic assist torque Tab and the like and a correction torque $T_{cmps}$, and a steering assist torque is controlled so that it conforms to the final target assist torque Ta.

10 Claims, 20 Drawing Sheets

ELECTRIC POWER STEERING DEVICE

TECHNICAL FIELD

The present invention relates to a power steering device for a vehicle such as an automobile and, more particularly, to an electric power steering device.

BACKGROUND ART

In the field of a steering device for a vehicle such as an automobile, it has been well known to reduce steering burden of a driver and improve steering feeling by controlling assist torque of an electric power steering device or by controlling steering reactive force of a steering device of steer-by-wire-type.

Particularly in Japanese Patent Application Laid-Open (kokai) No. 2006-182052, a steering device of steer-by-wire-type is described which controls steering reactive force in accordance with steering torque. In view of the fact that steering reactive force lowers in the specific steering frequency area, the steering device suppresses lowering of steering reactive force in a specific steering frequency area by reducing a gain of a transfer function from steering angle to steering torque.

In Japanese Patent Application Laid-Open (kokai) No. 2003-306158, an electric power steering device is described which conducts damping control (viscosity compensation control) on the basis of steering angular velocity. The electric power steering device enhances the component of around yaw rate resonance frequency contained in steering angular velocity signal to thereby suppress lowering of steering reactive force when steering frequency is at or near yaw rate resonance frequency.

In general, referring to the response of steering reactive force against steering angle, magnitude of steering reactive force lowers at a specific steering frequency and the phase of steering reactive force varies in accordance with steering frequency. Particularly, in an area where steering frequency is higher than the specific steering frequency, the phase of steering reactive force advances, so that damping property increases and viscous feeling sensed by a driver rises. At the same time, in an area where steering frequency is lower than the specific steering frequency, phase of steering reactive force delays, so that damping property decreases and viscous feeling sensed by a driver lowers.

In conventional steering devices such as those described in the above references, it is not considered that, the phase of steering reactive force response against steering angle varies in accordance with steering frequency, which results in variation in viscous feeling. Accordingly, in conventional steering devices, it is not possible to prevent viscous feeling from varying in accordance with steering frequency, and accordingly there is a room to improve in enhancing steering feeling.

DISCLOSURE OF THE INVENTION

A primary object of the present invention is to reduce the variation of viscous feeling due to the change of steering velocity by compensating the lowering in magnitude of steering reactive force response against steering angle at a specific steering velocity and by suppressing the variation in phase of steering reactive force due to the change of steering velocity, and to provide an electric power steering apparatus which presents better steering feeling than conventional steering devices.

The present invention provides an electric power steering device having a steering input means which is operated by a driver, a steering means which is provided between the steering input means and steered wheels and steers the steered wheels in response to steering operation conducted by a driver with the steering input means, an electric steering assist force generating means for imparting steering assist force to the steering means, a steering force attaining means for attaining steering force imparted to the steering input means by a driver, and a control means for calculating a target steering assist force in accordance with at least the steering force and controlling steering assist force generated by the steering assist force generating means on the basis of the target steering assist force, wherein the electric power steering device has a steering velocity attaining means for attaining velocity of steering operation conducted with the steering input means as steering velocity, and the control means calculates a correction amount by filtering the steering velocity with a filter of second-order lag and first-order advance; corrects the target steering assist force with the correction amount; and controls the steering assist force generated by the steering assist force generating means on the basis of the corrected target steering assist force.

The present invention also provides an electric power steering device having a steering input means which is operated by a driver, a steering means which is provided between the steering input means and steered wheels and steers the steered wheels in response to steering operation conducted by a driver with the steering input means, an electric steering assist force generating means for imparting steering assist force to the steering means, a steering force attaining means for attaining steering force imparted to the steering input means by a driver, and a control means for calculating a target steering assist force in accordance with at least the steering force and controlling steering assist force generated by the steering assist force generating means on the basis of the target steering assist force, wherein the electric power steering device has a steering velocity attaining means for attaining velocity of steering operation conducted with the steering input means as steering velocity; the control means calculates a correction amount on the basis of steering velocity; corrects the target steering assist force with the correction amount; and controls the steering assist force generated by the steering assist force generating means on the basis of the corrected target steering assist force; and the control means calculates the correction amount so that when magnitude of steering velocity is in a specific area, the magnitude of the correction amount is smaller than that when steering velocity is in an area other than the specific area, and when steering velocity is in an area higher than the specific area, the phase of steering reactive force relative to steering operation is shifted toward delay side than that when steering velocity is in an area lower than the specific area.

In a two-wheel model of a vehicle shown in FIG. 11, the mass and yaw inertia moment of a vehicle 100 are denoted by M and $I_z$, respectively, and cornering forces of a front wheel 102$f$ which is a steered wheel and rear wheel 102$r$ which is a non-steered wheel are denoted by $F_f$ and $F_r$, respectively. The distances between a gravity center 104 of the vehicle and between front wheel axle 106$f$ and rear wheel axle 106$r$ are denoted by $L_f$ and $L_r$, respectively; slip angle of the vehicle is denoted by $\beta$; and yaw rate of the vehicle is denoted by $\gamma$. Further, vehicle speed is denoted by V and Laplace operator is denoted by s. Under-described equations 1 and 2 are derived from the equilibrium of forces acting in lateral direction of the vehicle and the equilibrium of forces acting about the gravity center of the vehicle, respectively.

$$MV(\beta \cdot s + \gamma) = F_f + F_r \quad (1)$$

$$Izy \cdot s = F_f L_f - F_r L_r \quad (2)$$

Although not illustrated, a sum of caster trail and pneumatic trail of the front wheel 102f is denoted by $\xi$. Then, steering reactive torque $T_q$ about king pin axis of the front wheel 102f is given by the following equation 3:

$$T_q = \xi \cdot F_f \quad (3)$$

Actual steered wheel angle is denoted by $\delta$ and the cornering powers of the front wheel 102f and the rear wheel 102r are denoted by $K_f$ and $K_r$, respectively. Then, cornering forces $F_f$ and $F_r$ of the front and rear wheels are expressed by the following equations 4 and 5, respectively:

$$F_f = K_f \left( \delta - \beta - \frac{\gamma}{V} L_f \right) \quad (4)$$

$$F_r = K_r \left( -\beta + \frac{\gamma}{V} L_r \right) \quad (5)$$

Wheel base of the vehicle 100 is denoted by L ($=L_f+L_r$); allocation rate of vehicle load for front wheel is denoted by $D_{wf}$; and normalized cornering powers of the front wheel 102f and the rear wheel 102r are denoted by $C_f$ and $C_r$, respectively. Gravity acceleration is denoted by g and normalized inertia moment about vertical axis of the vehicle is denoted by $I_{zN}$. Then, utilizing normalized expressions, the distance $L_f$ between a gravity center 104 of the vehicle and front wheel axle 106f, the distance $L_r$ between a gravity center 104 of the vehicle and rear wheel axle 106r, the cornering powers $K_f$ and $K_r$, respectively, of the front wheel 102f and the rear wheel 102r, and yaw inertia moment $I_z$ of the vehicle are given by the following associated equations 6 to 10:

$$L_f = L(1 - D_{wf}) \quad (6)$$

$$L_r = L D_{wf} \quad (7)$$

$$K_f = C_f M D_{wf} g \quad (8)$$

$$K_r = C_r M (1 - D_{wf}) g \quad (9)$$

$$I_z = I_{zN} M L_f L_r \quad (10)$$
$$= I_{zN} M L D_{wf} (1 - D_{wf})$$

Normalized yaw inertia moment $I_z$ about vertical axis of an actual vehicle is approximately 1. Accordingly, $I_z$ is assumed to be 1 for simplicity and yaw inertia moment $I_z$ of a vehicle is given by the following equation 11:

$$I_z = M L D_{wf} (1 - D_{wf}) \quad (11)$$

Based on the above-described equations 1 to 9 and 11, the response of steering reactive torque $T_q$ against an actual steered angle $\delta$ of the front wheel 102f (the torque acting about king pin axis of the front wheel 102f) is expressed by the following equation 12:

$$T_q = \frac{\xi(VL \cdot s^2 + C_r g L \cdot s + C_r g V) V g M D_{wf} C_f}{V^2 L \cdot s^2 + (C_f + C_r) g V L \cdot s +} \delta \quad (12)$$
$$(C_r - C_f) g V^2 + C_f C_r g^2 L$$

The vehicle is now assumed to be in steady turning state. By substituting s=0 into the above-described equation 12, steering reactive torque $T_{q0}$ under the condition where the vehicle is in steady turning state can be expressed by the under-described equation 13. As is known from the equation 13, if actual steered wheel angle $\delta$ and vehicle speed V are each the same, steering reactive torque $T_{q0}$ is the same irrespective of steering velocity.

$$T_{q0} = \frac{\xi V^2 g M D_{wf} C_f C_r}{(C_r - C_f) V^2 + C_f C_r g L} \delta \quad (13)$$

A correction torque for steering reactive torque $T_q$ is now denoted by $T_{cmp}$ and the correction torque $T_{cmp}$ is deemed to satisfy the under-described equation 14. The correction of steering reactive torque $T_q$ with the correction torque $T_{cmp}$ by imparting the correction torque $T_{cmp}$ to the front wheel 102f about king pin axis makes it possible to prevent the magnitude of the steering reactive torque transmitted to the steering wheel serving as a steering input means from varying due to the change of steering velocity and makes it as well possible to prevent the phase of the steering reactive torque from varying due to the change of steering velocity. In other words, the correction makes it possible to keep constant the dynamic response property of steering reactive torque of a vehicle against steering velocity.

$$T_q + T_{cmp} = T_{q0} = \frac{\xi V^2 g M D_{wf} C_f C_r}{(C_r - C_f) V^2 + C_f C_r g L} \delta \quad (14)$$

On the basis of the above-described equations 12 and 14, the correction torque $T_{cmp}$ is given by the under-described equation 15. The equation 15 can be simplified as the following equation 16:

$$T_{cmp} = \frac{-\xi V g C_f^2 D_{wf} M L((C_r g V L - V^3) s +}{(V^2 L \cdot s^2 + (C_f + C_r) g V L \cdot s + C_f C_r g^2 L +} \delta \quad (15)$$
$$\frac{C_r^2 g^2 L - 2 C_r g V^2) s}{(C_r - C_f) g V^2)((C_r - C_f) V^2 - C_f C_r g L)}$$

$$T_{cmp} = \frac{\omega^2 (1 + T_n s)}{(s^2 + 2 \zeta \omega \cdot s + \omega^2)} G \cdot s \cdot \delta \quad (16)$$

It is to be noted that the coefficients in the above-described equation 16 are as follows:

$$G = \frac{C_f^2 C_r M D_{wf} g V L (2 V^2 - C_r g L)}{[C_f C_r g L + (C_r - C_f) V^2]^2} \xi \quad (17)$$

-continued $$T_n = \frac{V(V^2 - C_r gL)}{C_r g(2V^2 - C_r gL)} \quad (18)$$

$$\omega^2 = \frac{C_f C_r g^2}{V^2} + \frac{C_r - C_f}{L} g \quad (19)$$

$$2\zeta\omega = \frac{C_f + C_r}{V} g \quad (20)$$

$$\zeta = \frac{C_f + C_r}{2V\sqrt{\frac{C_f C_r}{V^2}g^2 + \frac{C_r - C_f}{L}g}} g \quad (21)$$

When steering gear ratio is denoted by $N_s$ and steering angle is denoted by $\theta$, the steered angel $\delta$ of the front wheel is given by $\theta/N_s$. A correction torque which is obtained by transferring the correction torque $T_{cmp}$ to a torque about the steering shaft is denoted by $T_{cmps}$ and $G_s$ is given by the under-described equation 22. The correction torque $T_{cmps}$ is then expressed by the following equation 23:

$$G_s = \frac{G}{N_s^2} \quad (22)$$

$$T_{cmps} = \frac{T_{cmp}}{N_s}$$
$$= \frac{\omega^2(1 + T_n s)}{(s^2 + 2\zeta\omega \cdot s + \omega^2)} G \cdot s \cdot \frac{\theta}{N_s^2}$$
$$= \frac{\omega^2(1 + T_n s)}{(s^2 + 2\zeta\omega \cdot s + \omega^2)} G_s \cdot s \cdot \theta \quad (23)$$

It is understood from the above-described equation 23 that the correction torque $T_{cmps}$ is a value obtained by multiplying steering velocity $s \cdot \theta$ achieved by a driver with a transfer function of second-order lag and first-order advance so that although neither the steered angel $\delta$ of the front wheel nor steering angle $\theta$ is known, the correction torque $T_{cmps}$ can be calculated if steering velocity is known. The above-described transfer function can be considered as a product of a filter of second-order lag and first-order advance and a gain $G_s$.

As is understood from the above, by means of the procedures of attaining steering velocity $s \cdot \theta$, filtering the steering velocity $s \cdot \theta$ with a filter of second-order lag and first-order advance to calculate a correction torque $T_{cmps}$, and modifying a target steering assist torque with a correction torque $T_{cmps}$, it is possible to prevent the magnitude of the steering reactive torque transmitted to the steering wheel from varying due to the change of steering velocity and it is as well possible to prevent the phase of the steering reactive torque from varying due to the change of steering velocity.

According to the above-described former configuration of the present invention, a correction amount is calculated by filtering steering velocity with a filter of second-order lag and first-order advance; modifying target steering assist force with the correction amount to calculate a final target steering assist force; and controlling the steering assist force generated by the steering assist force generating means in accordance with the final target steering assist force.

According to the above-described latter configuration of the present invention, a correction amount is calculated on the basis of steering velocity; modifying the target steering assist force with the correction amount to calculate a final target steering assist force; and controlling the steering assist force generated by the steering assist force generating means on the basis of the final target steering assist force. In this connection, the correction amount is calculated so that when magnitude of steering velocity is in a specific area, the magnitude of the correction amount is smaller than that when steering velocity is in an area other than the specific area, and when steering velocity is in an area higher than the specific area, the phase of steering reactive force relative to steering operation is shifted toward delay side than that when steering velocity is in an area lower than the specific area.

According to these configurations, therefore, it is possible to prevent the magnitude of the steering reactive torque which a driver senses from varying due to the change of steering velocity and it is as well possible to prevent the phase of the steering reactive torque from varying due to the change of steering velocity, resulting in that the variation in viscous feeling due to the change of steering velocity is reduced so that steering feeling is positively enhanced.

The above-mentioned latter configuration may be such that: the control means calculates the correction amount so that when magnitude of steering velocity is in a specific area, the magnitude of the correction amount is smaller than that when steering velocity is in an area other than the specific area; when steering velocity is in an area higher than the specific area, the phase of steering reactive force relative to steering operation is shifted toward delay side; and when steering velocity is in an area lower than the specific area, the phase of steering reactive force relative to steering operation is shifted toward advance side.

According to this configuration, the variation in viscous feeling due to the change of steering velocity is reduced more effectively than in the case of the above-described former configuration of the present invention.

For example, vehicle mass M of a two-wheel model is denoted as 1800 kg; normalized inertia moment $I_{zN}$ is denoted as 1; allocation rate $D_{wf}$ of vehicle load for front wheel is denoted as 0.55; wheel base is denoted as 2.7 m; normalized cornering powers $C_f$ and $C_r$ of the front and rear wheels are denoted 10 and 20, respectively; damping ratio $\zeta$ is denoted as 0.05 m; and steering gear ratio $N_s$ is denoted as 18. In this application, this two-wheel model is called as "an illustrative two-wheel model".

In this illustrative two-wheel model, when target steering assist torque is not corrected with a correction torque in accordance with the above-described former or latter configuration, the relationships between steering frequency f (Hz) and steering reactive torque $T_q$ (Nm) and between steering frequency f (Hz) and phase $\phi$ (deg) of steering reactive torque for vehicle speed V of 100 km/h are as shown in broken lines in FIGS. 12 and 13, respectively. As shown in FIG. 12, steering reactive torque $T_q$ sharply drops in a specific area where steering frequency f is around a few Hz. As shown in FIG. 13, phase $\phi$ of steering reactive torque lags a lot in an area where steering frequency f is lower than the specific area while it advances a lot in an area where steering frequency f is higher than the specific area.

On the contrary, in the illustrative two-wheel model, when a gain $G_s$ and filter parameters such as damping ratio $\zeta$ in the above-described equation 23 are calculated in accordance with the above-described equations 17 to 21 and 22, and target steering assist torque is corrected with a correction torque $T_{cmps}$ calculated in accordance with the above-described equation 23, the relationships between steering frequency f (Hz) and steering reactive torque $T_q$ (Nm) and between steering frequency f (Hz) and phase $\phi$ (deg) of steering reactive torque for vehicle speed V of 100 km/h are as shown in solid lines in FIGS. 12 and 13, respectively. As is known, independently of steering frequency f, steering reactive torque $T_q$ is constant and phase $\phi$ of steering reactive torque is zero.

Although the time constant $T_n$ of first-order advance of the filter in the above-described equation 23 is a value expressed by the above-described equation 18, even if the time constant $T_n$ is zero, it is possible to prevent, not perfectly but positively, the magnitude and the phase of the steering reactive torque from varying due to the change of steering velocity.

In the illustrative two-wheel model, when the time constant $T_n$ is zero, the relationships between steering frequency f (Hz) and steering reactive torque $T_q$ (Nm) and between steering frequency f (Hz) and a phase $\phi$ (deg) of steering reactive torque for vehicle speed V of 100 km/h are as shown in solid lines in FIGS. 14 and 15, respectively. It is understood from FIGS. 14 and 15 that although the lowering and the variation of phase $\phi$ of steering reactive torque $T_q$ are not zero, the lowering and the variation of phrase $\phi$ of steering reactive torque $T_q$ can positively be made less as compared with the case where the basic target steering assist torque is not corrected with a correction amount in accordance with the above-mentioned configurations.

Thus, the above-mentioned configuration may be such that: the time constant of first-order advance of the filter is zero.

According to this configuration, the time constant of first-order advance of the filter is zero and the filter is a filter of second-order lag. Although the effect is lower than that in the case where the time constant of first-order advance is calculated according to the above-described equation 18, the variation of steering reactive torque in magnitude and phase can positively be suppressed and necessary calculation amount involved can be reduced.

As is known from the above-described equations 18 to 21, the filter parameters represented by these equations are functions of vehicle speed V. The filter parameters are also functions of normalized cornering powers $C_f$ and $C_r$ of the front and rear wheels, respectively, and normalized cornering powers $C_f$ and $C_r$ varies in accordance with vehicle weight and friction coefficient of road surface.

Thus, the above-mentioned configuration may be such that: the parameters of the filter are variably set in accordance with at least any one of vehicle speed, vehicle weight and friction coefficient of road surface.

According to this configuration, the parameters of the filter are variably set in accordance with at least any one of vehicle speed, vehicle weight and friction coefficient of road surface. Accordingly, as compared with the case where the parameters of the filter are constant, the filter can be more appropriately set in accordance with vehicle speed, vehicle weight and friction coefficient of road surface and it is thus possible to more properly reduce the variation of steering reactive torque in magnitude and phase due to the change of steering velocity, regardless of vehicle speed, vehicle weight and friction coefficient of road surface.

As is known from the above-described equation 17, the gain $G_s$ expressed by the equation is a function of vehicle speed V, vehicle weight and friction coefficient of road surface. FIG. 16 shows the relationship between vehicle speed V and the gain $G_s$ with respect to the illustrative two-wheel model. As shown in FIG. 16, the gain $G_s$ is negative when vehicle speed V is in an area lower than approximately 60 km/h but is positive and gradually increases as vehicle speed V goes up when vehicle speed V is in an area higher than approximately 60 km/h. In this connection, it is assumed that the sign inversion of the gain $G_s$ occurs due to the fact that, as shown in FIG. 17, the time constant $T_n$ becomes infinite when vehicle speed V is approximately 60 km/h and the sign of the gain $G_s$ inverts across the vehicle speed V of around 60 km/h.

Thus, the above-mentioned configuration may be such that: when vehicle speed is low, the control means reduces the magnitude of the correction amount, as compared with the case where vehicle speed is high.

According to this configuration, when vehicle speed is low, the magnitude of the correction amount is reduced, as compared with the case where vehicle speed is high. Accordingly, it is possible to more properly reduce the variation of steering reactive torque in magnitude and phase due to the change of steering velocity, regardless of vehicle speed, vehicle weight and friction coefficient of road surface, as compared with the case, for example, where the magnitude of the correction amount is not varied in accordance with vehicle speed.

As described above, the gain $G_s$ is negative when vehicle speed V is in a lower area. However, even if the gain $G_s$ is set to zero when vehicle speed V is in a lower area, it is possible to positively reduce the variation of steering reactive torque in magnitude and phase due to the change of steering velocity in medium and higher vehicle speed area where the gain $G_s$ is not set to zero.

Thus, the above-mentioned configuration may be such that: the control means sets the correction amount to zero when vehicle speed is not higher than a reference vehicle speed.

According to this configuration, the correction amount is set to zero when vehicle speed is not higher than a reference vehicle speed. Accordingly, the control of steering assist torque can easily be executed when vehicle speed is not more than a reference vehicle speed and it is possible to positively reduce the variation of steering reactive torque in magnitude and phase due to the change of steering velocity when vehicle speed is higher than a reference vehicle speed.

The above-mentioned configurations may be such that: the steering input means is a steering wheel and the control means calculates a target assist torque on the basis of at least steering torque; calculates a correction torque by filtering steering velocity with a filter of second-order lag and first-order advance; corrects target steering assist torque with the correction torque; and controls the steering assist force generated by the steering assist force generating means on the basis of the corrected target steering assist torque.

The above-mentioned configurations may be such that: the control means calculates the correction torque $T_{cmps}$ according to the above-described equation 23.

The above-described equation 23 can be deformed to the under-described equation 24. The investigation of the relationship between vehicle speed V and the product $G_s \cdot T_n$ proves that it is as shown in FIG. 18. As is understood from the comparison of FIGS. 17 and 18, by calculating the correction torque $T_{cmps}$ according to the under-described equation 24 in which $G_s \cdot T_n$ serves as a time constant, the time constant $G_s \cdot T_n$ can be prevented from becoming infinite.

$$T_{cmps} = \frac{\omega^2 (G_s + G_s T_n s)}{(s^2 + 2\zeta\omega \cdot s + \omega^2)} \cdot s \cdot \theta \qquad (24)$$

The above-mentioned configurations may be such that: the control means calculates the correction torque $T_{cmps}$ according to the above-described equation 24.

The above-mentioned configurations may be such that: the control means calculates the time constant $G_s \cdot T_n$ according to the above-described equation 18.

The above-mentioned configurations may be such that: the control means calculates the correction torque $T_{cmps}$ according to the under-described equation 25 in which the time constant $T_n$ in the above-described equation 23 is set to zero.

$$T_{cmps} = \frac{\omega^2}{(s^2 + 2\zeta\omega \cdot s + \omega^2)} G_s \cdot s \cdot \theta \quad (25)$$

The above-mentioned configurations may be such that: the control means calculates the filter parameters according to the above-described equations 19 to 21.

The above-mentioned configurations may be such that: the control means calculates the gain $G_s$ according to the above-described equations 17 and 22.

It is preferable to calculate the gain $G_s$ according to the above-described equations 17 and 22. However even if $G_s$ is a value less than that calculated according to the above-described equations 17 and 22, it is possible to more positively reduce the variation of steering reactive torque in magnitude and phase due to the change of steering velocity than in the case where the target steering assist torque is not corrected with the correction torque.

For example, the solid lines in FIGS. 19 and 20 show the relationships between steering frequency f (Hz) and steering reactive torque $T_q$ (Nm) and between steering frequency f (Hz) and phase $\phi$ (deg) of steering reactive torque, respectively, for vehicle speed V of 100 km/h, with respect to the case where the magnitude of the gain $G_s$ is set to 50% of that calculated according to the above-described equations 17 and 22 in the illustrative two-wheel model. It is understood from the comparison of solid lines and broken lines (showing values when no correction is made with the correction amount) in FIGS. 19 and 20 that even in the case where the magnitude of the gain $G_s$ is set to 50% of innate value, it is still possible to positively reduce the variation of steering reactive torque in magnitude and phase due to the change of steering velocity.

The solid lines in FIGS. 21 and 22 show the relationships between steering frequency f (Hz) and steering reactive torque $T_q$ (Nm) and between steering frequency f (Hz) and phase $\phi$ (deg) of steering reactive torque, respectively, for vehicle speed V of 140 km/h, with respect to the case where the gain $G_s$ is calculated based on the vehicle speed V of 140 km/h and the correction torque $T_{cmps}$ is calculated according to the above-described equation 23 utilizing the time constant $T_n$ and the filter parameters calculated in advance for vehicle speed V of 100 km/h and the gain $G_s$ in the illustrative two-wheel model.

The solid lines in FIGS. 23 and 24 show the relationships between steering frequency f (Hz) and steering reactive torque $T_q$ (Nm) and between steering frequency f (Hz) and phase $\phi$ (deg) of steering reactive torque, respectively, for vehicle speed V of 180 km/h, with respect to the case where the gain $G_s$ is calculated based on the vehicle speed V of 80 km/h and the correction torque $T_{cmps}$ is calculated according to the above-described equation 23 utilizing the time constant $T_n$ and the filter parameters calculated in advance for vehicle speed V of 100 km/h and the gain $G_s$ in the illustrative two-wheel model.

It is understood from the comparison of solid lines and broken lines (showing values when no correction is made with the correction amount) in FIGS. 21 to 24 that even in the case where the time constant $T_n$ and the filter parameters calculated in advance for a specific vehicle speed V are utilized and only the gain $G_s$ is calculated based on the vehicle speed V, it is still possible to more positively reduce the variation of steering reactive torque in magnitude and phase due to the change of steering velocity as compared with the case where no correction is made with the correction amount.

The above-mentioned configurations may be such that: the control means calculates the gain $G_s$ on the basis of vehicle speed V and calculates the correction torque $T_{cmps}$ according to the above-described equation 23 utilizing the time constant $T_n$ and the filter parameters calculated in advance for a specific vehicle speed V and the gain $G_s$.

The above-mentioned configurations may be such that: the control means calculates the product $G_s \cdot T_n$ of the time constant $T_n$ and the gain $G_s$ on the basis of vehicle speed V according to the under-described equation 26 and calculates the correction torque $T_{cmps}$ according to the above-described equation 24 utilizing the filter parameters calculated in advance for a specific vehicle speed V and the product $G_s \cdot T_n$.

$$G_s T_n = \frac{G}{N_s^2} T_n \quad (26)$$

$$= \frac{C_f^2 M D_{wf} V^2 L(2V^2 - C_r g L)}{N_s^2 [C_f C_r g L + (C_r - C_f) V^2]^2}$$

The solid lines in FIGS. 25 and 26 show the relationships between steering frequency f (Hz) and steering reactive torque $T_q$ (Nm) and between steering frequency f (Hz) and phase $\phi$ (deg) of steering reactive torque, respectively, for vehicle speed V of 140 km/h, with respect to the case where the gain $G_s$ is calculated based on the vehicle speed V of 140 km/h and the correction torque $T_{cmps}$ is calculated according to the above-described equation 25 utilizing the filter parameters calculated in advance for vehicle speed V of 100 km/h and the gain $G_s$ in the illustrative two-wheel model.

It is understood from the comparison of solid lines and broken lines (showing values when no correction is made with the correction amount) in FIGS. 25 and 26 that even in the case where the filter parameters calculated in advance for a specific vehicle speed V are utilized and only the gain $G_s$ is calculated based on the vehicle speed V, it is still possible to more positively reduce the variation of steering reactive torque in magnitude and phase due to the change of steering velocity as compared with the case where no correction is made with the correction amount.

Thus, the above-mentioned configurations may be such that: the control means calculates the gain $G_s$ on the basis of vehicle speed V and calculates the correction torque $T_{cmps}$ according to the above-described equation 25 utilizing the filter parameters calculated in advance for a specific vehicle speed V and the gain $G_s$.

As described above, the relationship between vehicle speed V and the gain $G_s$ is as shown in FIG. 16. The relationship between vehicle speed V and the gain $G_s$ can be approximated to the relationship shown in FIG. 27.

Thus, the above-mentioned configurations may be such that: the control means calculates the gain $G_s$ based on vehicle speed V according to a map corresponding to the graph shown in FIG. 27.

As described above, the relationship between vehicle speed V and the time constant $T_n$ is as shown in FIG. 17. When the relationship between vehicle speed V and the gain $G_s$ is approximated to the relationship shown in FIG. 27, the sign of the gain $G_s$ does not reverse due to the change of vehicle speed V. Accordingly, the relationship between vehicle speed V and the time constant $T_n$ can be approximated to the relationship shown in FIG. 28.

Thus, the above-mentioned configurations may be such that: the control means calculates the time constant $T_n$ based on vehicle speed V according to a map corresponding to the graph shown in FIG. 28.

As described above, the relationship between vehicle speed V and the product $G_s \cdot T_n$ is as shown in FIG. 18. The relationship between vehicle speed V and the product $G_s \cdot T_n$ can be approximated to the relationship shown in FIG. 29.

Thus, the above-mentioned configurations may be such that: the control means calculates the product $G_s \cdot T_n$ based on vehicle speed V according to a map corresponding to the graph shown in FIG. 29.

BEST MODE FOR CARRYING OUT THE INVENTION

Preferred embodiments of the present invention will next be described with reference to the appended drawings.

First Embodiment

Figure 1:
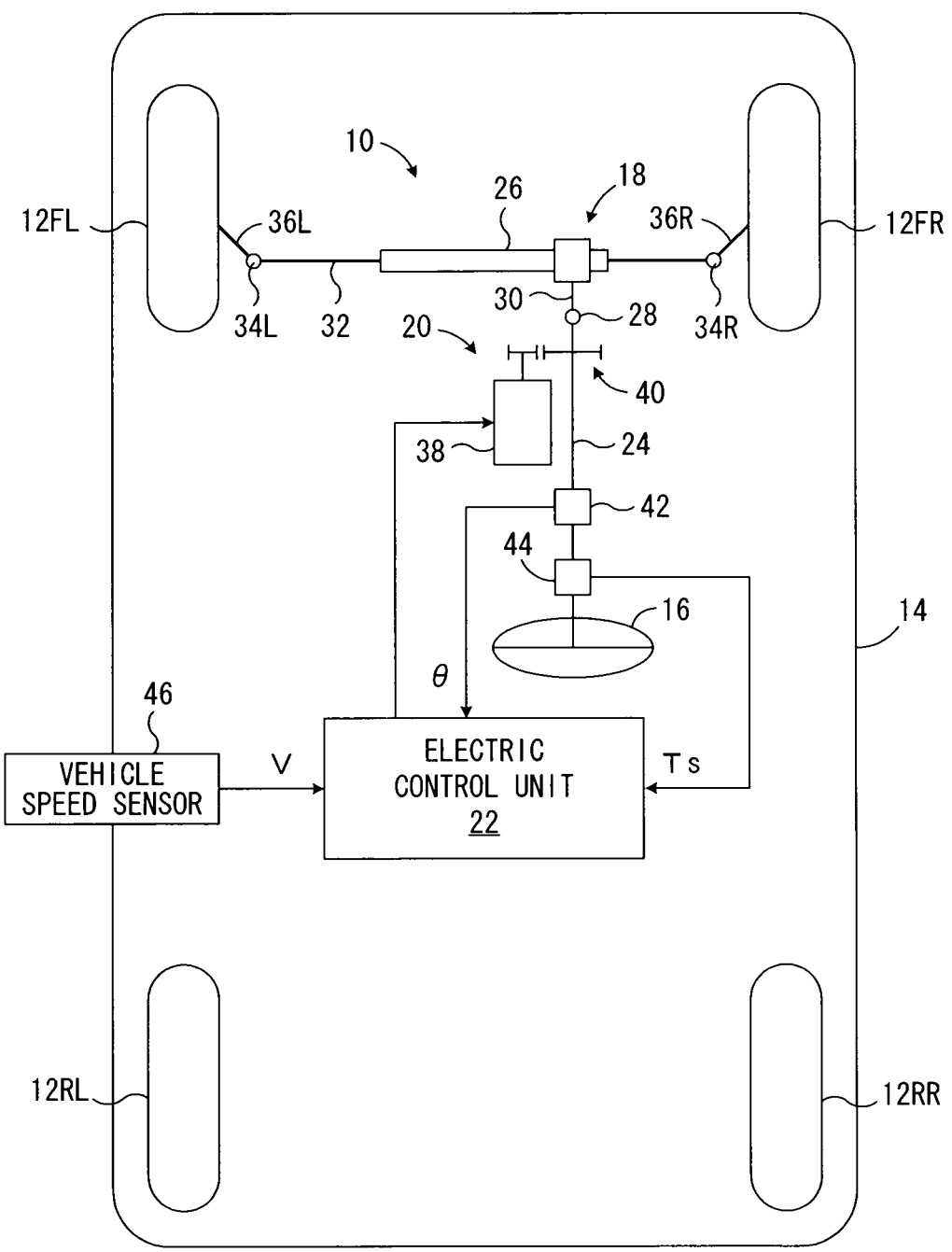
FIG. 1 is a diagrammatical view of a first embodiment of an electric power steering device according to the present invention.

FIG. 1 is a diagrammatical view of a first embodiment of an electric power steering device according to the present invention.

In FIG. 1, reference numeral 10 wholly denotes an electric power steering device according to the present invention. Reference numerals 12FL and 12FR denote left and right front wheels, respectively, which are steered wheels of a vehicle 14, while reference numerals 12RL and 12RR denote left and right rear wheels, respectively, which are non-steered wheels of the vehicle 14. The electric power steering device 10 has a steering wheel 16 serving as a steering input means which is operated by a driver, a steering apparatus 18, a power steering actuator 20, and an electronic control unit 22.

The steering apparatus 18 is provided between the steering wheel 16 and the left and right front wheels 12FL and 12FR and steers the left and right front wheels 12FL and 12FR in response to the steering operation of the steering wheel 16 by a driver. In the illustrated embodiment the steering apparatus 18 comprises a steering shaft 24 and a rack-and-pinion-type steering unit 26. The upper end of the steering shaft 24 is coupled with the steering wheel 16 via torsion bar, not shown in the figure, and the lower end of the steering shaft 24 is coupled with a pinion shaft 30 of the steering unit 26 via a universal joint 28.

Tie rods 36L and 36R are pivotally connected at their inner ends with the opposite ends of a rack bar 32 of the steering unit 26 via ball joints 34L and 34R, respectively. The outer ends of the tie rods 36L and 36R are pivotally connected with distal ends of knuckle arms, not shown in the figure, of the left and right front wheels 12FL and 12FR, respectively. Linear motion of the rack bar 32 in the lateral direction of the vehicle is transferred to rotational motions around king pin axes, not shown in the figure, of the left and right front wheels 12FL and 12FR by the tie rods 36L and 36R, so that the left and right front wheels 12FL and 12FR are steered.

In the embodiment shown in the figure, the power steering actuator 20 has an electric motor 38 and a velocity reducing gear mechanism 40 which transmits the rotational torque of the electric motor 38 to the steering shaft 24. The power steering actuator 20 generates steering assist force to drivingly rotate the steering shaft 24 relative to a vehicle body, thereby generating steering assist torque for reducing the steering burden of a driver.

The steering shaft 24 is provided with a steering angle sensor 42 for detecting steering angle θ and a torque sensor 44 for detecting steering torque Ts. The vehicle 14 is provided with a vehicle speed sensor 46 for detecting vehicle speed V. In this connection, the steering angle sensor 42 and the torque sensor 44 detect steering angle θ and steering torque Ts, respectively with clockwise turning direction of the vehicle being positive.

As shown in the figure, input to the electronic control unit 22 are a signal indicating a steering angle θ detected by the steering angle sensor 42, a signal indicating steering torque Ts detected by the torque sensor 44, and a signal indicating vehicle speed V detected by the vehicle speed sensor 46. Although not shown in the figure, the electronic control unit 22 incorporates a microcomputer which may be of an ordinary type including a CPU, a RAM, a ROM, input and output port means and a common bus interconnecting these elements.

Figure 2:
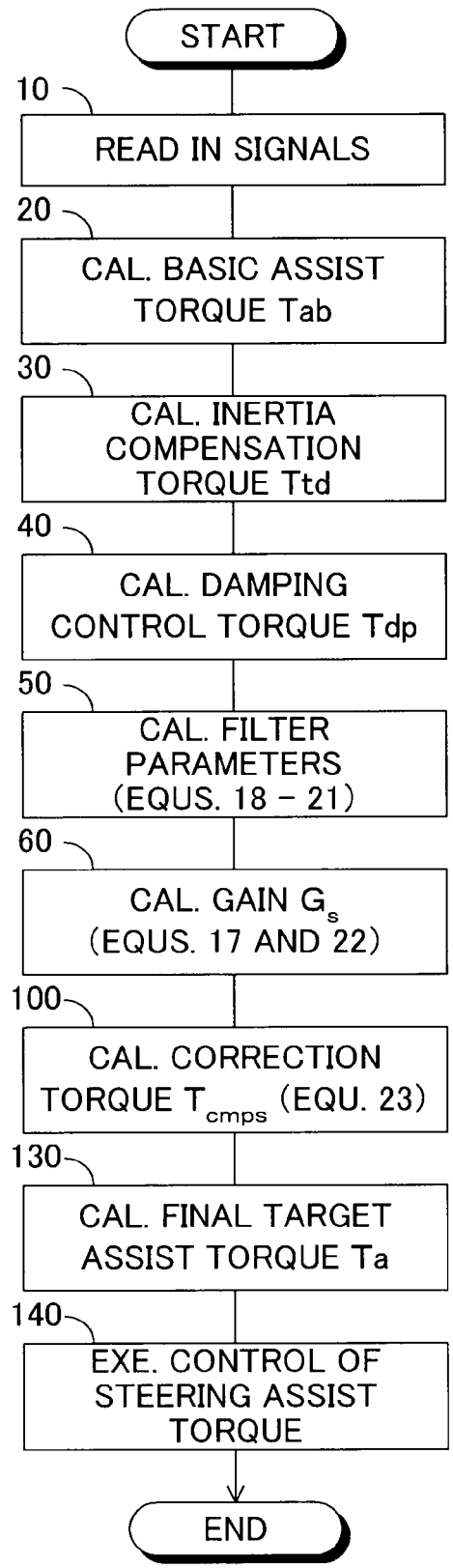
FIG. 2 is a flowchart showing an assist torque control routine in a first embodiment.

The electronic control unit 22 calculates, according to the flowchart shown in FIG. 2, a basic assist torque Tab for reducing the steering burden of a driver on the basis of a steering torque Ts and vehicle speed V. The electronic control unit 22 also calculates an inertia compensation torque Ttd for reducing an inertial feeling (harsh feeling) of steering on the basis of steering torque Ts, a differential value Tsd thereof and vehicle speed V. The electronic control unit 22 further calculates a damping control torque Tdp for enhancing a convergence characteristic of the steering wheel 16 on the basis of steering angle velocity θd which is a differential value of steering angle θ, vehicle speed V, and steering torque Ts.

The electronic control unit 22 calculates, according to the flowchart shown in FIG. 2, a correction torque $T_{cmps}$ and calculates a final target assist torque Ta by summing a basic assist torque Tab, an inertia compensation torque Ttd, a damping control torque Tdp and a correction torque $T_{cmps}$. In other words, the electronic control unit 22 calculates a final target assist torque Ta by modifying with a correction torque $T_{cmps}$ a basic target assist torque which is a sum of a basic assist torque Tab, an inertia compensation torque Ttd and a damping control torque Tdp.

Further, the electronic control unit 22 controls the electric motor 38 of the power steering actuator 20 on the basis of the final target assist torque Ta so that steering assist torque generated by the power steering actuator 20 conforms to the final target assist torque Ta.

In the regard, it is to be noted that a basic target assist torque may be calculated in any manner known in the art as long as it is calculated as an assist torque for reducing the steering burden of a driver on the basis of at least steering torque. Similarly, a basic assist torque Tab, an inertia compensation torque Ttd and a damping control torque Tdp may be calculated in any manner known in the art.

The routine for controlling an assist torque in the first embodiment will be described below by referring to the flowchart shown in FIG. 2. The control according to the routine shown in FIG. 2 is started by a closure of an ignition switch not shown in the figure and cyclically repeated.

First, in step 10, the signals such as a signal indicating steering torque Ts detected by the torque sensor 44 are read in. In step 20, a basic assist torque Tab is calculated on the basis of steering torque Ts and vehicle speed V in a manner known in the art so that the magnitude of the basic assist torque Tab increases as the magnitude of steering torque Ts becomes larger and the magnitude of the basic assist torque Tab lowers as vehicle speed V becomes higher.

In step 30, an inertia compensation torque Ttd is calculated on the basis of steering torque Ts, a differential value Tsd thereof and vehicle speed V in a manner known in the art. In step 40, a damping control torque Tdp is calculated on the basis of steering angle velocity θd, vehicle speed V and steering torque Ts in a manner known in the art In step 50, filter parameters such as a time constant $T_n$ are calculated on the basis of vehicle speed V according to the above-described equations 18 to 21 with normalized cornering powers $C_f$ and $C_r$ of the front and rear wheels, respectively, a mass M of the vehicle, allocation rate $D_{wf}$ of vehicle load for front wheel and the other parameter being deemed to be known constant values. In step 60, a gain $G_s$ is calculated on the basis of vehicle speed V according to the above-described equations 17 to 22 with a normalized cornering power $C_r$ of the rear wheel being a known constant value.

In step 100, a steering velocity s·θ is calculated as a time-differential value of steering angle θ and a correction torque $T_{cmps}$ is calculated according to above-described equation 23 on the basis of filter parameters calculated in step 50 and a gain $G_s$ calculated in step 60.

In step 130, a final target assist torque Ta is calculated by summing a basic assist torque Tab, an inertia compensation torque Ttd, a damping control torque Tdp and a correction torque $T_{cmps}$.

In step 140, a control signal corresponding to the final target assist torque Ta is output to the electric motor 38, thereby executing control of a steering assist torque so that assist torque for reducing a steering torque which is needed for a driver conforms to the final target assist torque Ta.

Thus, according to the first embodiment, a basic assist torque Tab, an inertia compensation torque Ttd and a damping control torque Tdp are calculated in steps 20 to 40, respectively. In step 50, filter parameters such as a time constant $T_n$ are calculated according to the above-described equations 18 to 21 and in step 60, a gain $G_s$ is calculated according to the above-described equations 17 to 22. In step 100, a correction torque $T_{cmps}$ is calculated according to the above-described equation 23; in step 130, a final target assist torque Ta is calculated by summing a basic assist torque Tab, an inertia compensation torque Ttd, a damping control torque Tdp and a correction torque $T_{cmps}$; and in step 140, a steering assist torque is controlled so that it conforms to the final target assist torque Ta.

Second Embodiment

Figure 3:
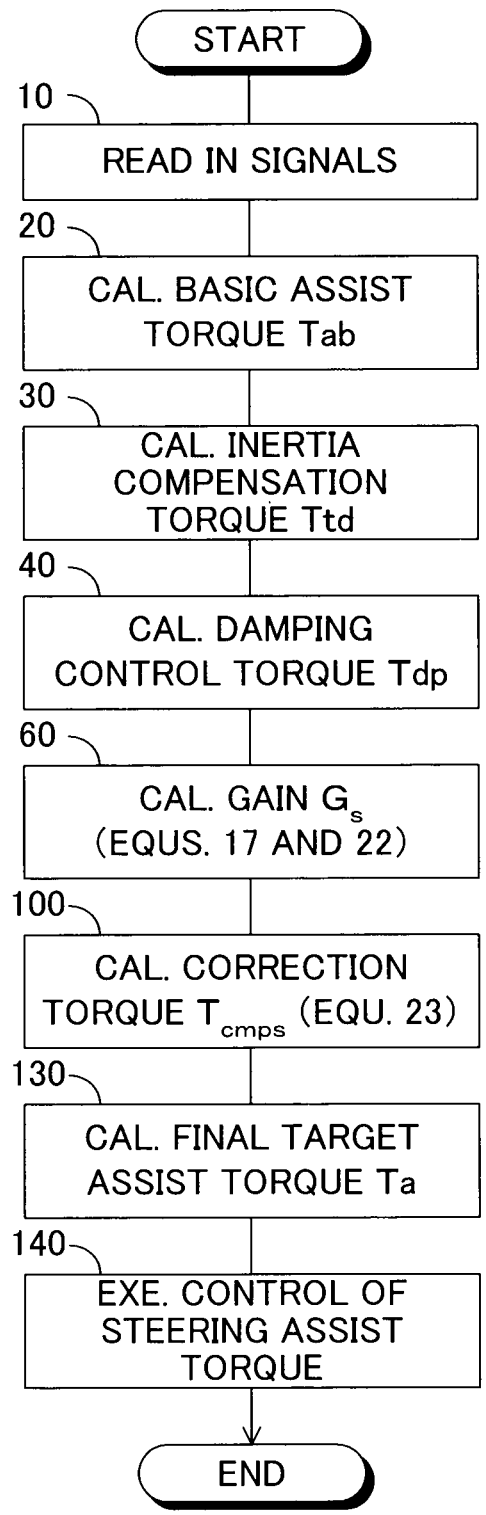
FIG. 3 is a flowchart showing an assist torque control routine in a second embodiment.

FIG. 3 is a flowchart showing an assist torque control routine in a second embodiment of an electric power steering device according to the present invention. In FIG. 3, steps similar to those appearing in FIG. 2 are denoted by like step numbers appearing in FIG. 2, and this applies to the flowcharts of third to ninth embodiments to be described later.

In this second embodiment, steps 10 to 40 are executed in the same manner as in the first embodiment and after step 40 has been completed, step 60 is executed in the same manner as in the first embodiment without step 50 being executed.

Also in this second embodiment, filter parameters such as a time constant $T_n$ expressed by the above-described equations 18 to 21 are calculated for vehicle speed V of for example 100 km/h and are stored in ROM. Therefore, in step 100, steering velocity s·θ is calculated as a time-differential value of steering angle θ and a correction torque $T_{cmps}$ is calculated according to the above-described equation 23 on the basis of vehicle speed V, filter parameters stored in ROM and a gain $G_s$ calculated in step 60. Further, steps 130 and 140 are executed in the same manner as in the first embodiment.

Thus, according to the second embodiment, a correction torque $T_{cmps}$ can be calculated as in the first embodiment with the exception that a step corresponding to step 50 in the first embodiment is not executed and filter parameters stored in ROM are utilized.

Third Embodiment

Figure 4:
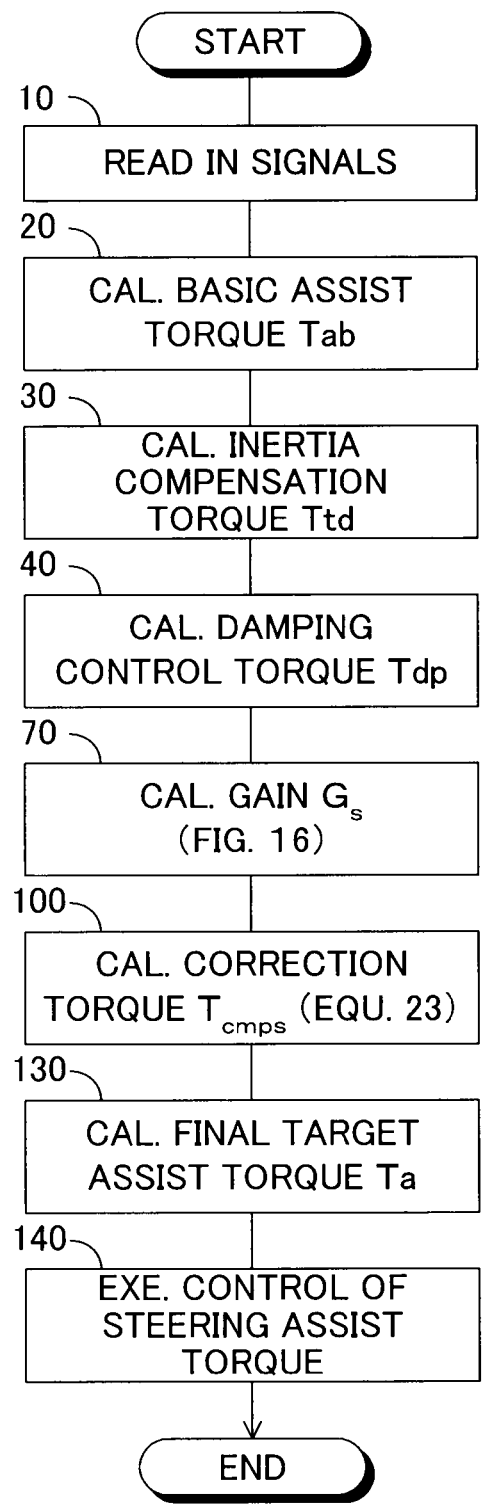
FIG. 4 is a flowchart showing an assist torque control routine in a third embodiment.

FIG. 4 is a flowchart showing an assist torque control routine in a third embodiment of an electric power steering device according to the present invention.

Figure 16:
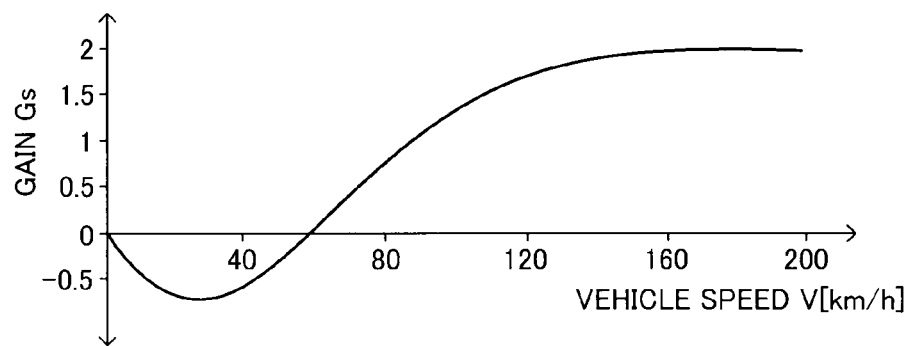
FIG. 16 is a graph showing the relationship between vehicle speed V and a gain $G_s$ with respect to the illustrative two-wheel model of a vehicle.
Figure 17:
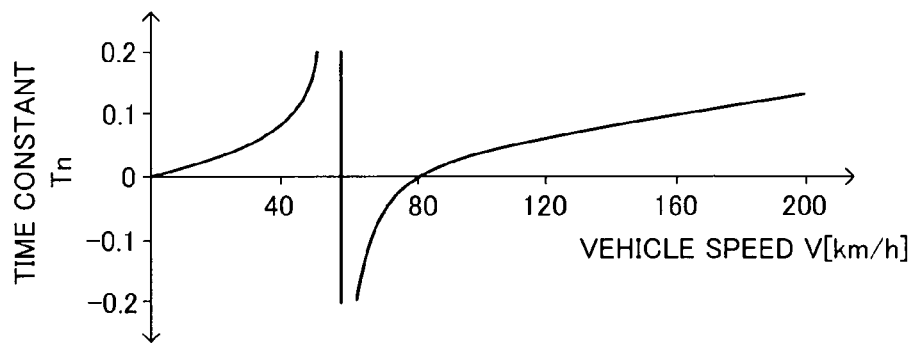
FIG. 17 is a graph showing the relationship between vehicle speed V and a time constant $T_n$ with respect to the illustrative two-wheel model of a vehicle.

In this third embodiment, steps 10 to 40 and steps 100 to 140 are executed in the same manner as in the first embodiment and after step 40 has been completed, in step 70, a gain $G_s$ is calculated on the basis of vehicle speed V according to a map corresponding to the graph shown in FIG. 16 without any step corresponding to step 50 in the first embodiment being executed.

Thus, according to the third embodiment, a correction torque $T_{cmps}$ can be calculated as in the first embodiment with the exception that a step corresponding to step 50 in the first embodiment is not executed; filter parameters stored in ROM are utilized; and a gain $G_s$ is calculated according to a map corresponding to the graph shown in FIG. 16.

As is understood from the above descriptions, according to the first to third embodiments, since a correction torque $T_{cmps}$ is calculated according to the above-described equation 23, it is calculated as a value which is obtained by filtering steering velocity s·θ by a filter of second-order lag and first-order advance. Accordingly, in addition to positively and effectively suppress the variation in magnitude of steering torque which a driver feels when steering velocity changes, it is possible to positively and effectively suppress the variation in phase of steering torque which a driver feels, to thereby reduce the variation of viscous feeling that can come along with the change of steering velocity so as to positively and effectively enhance steering feeling.

Fourth Embodiment

Figure 5:
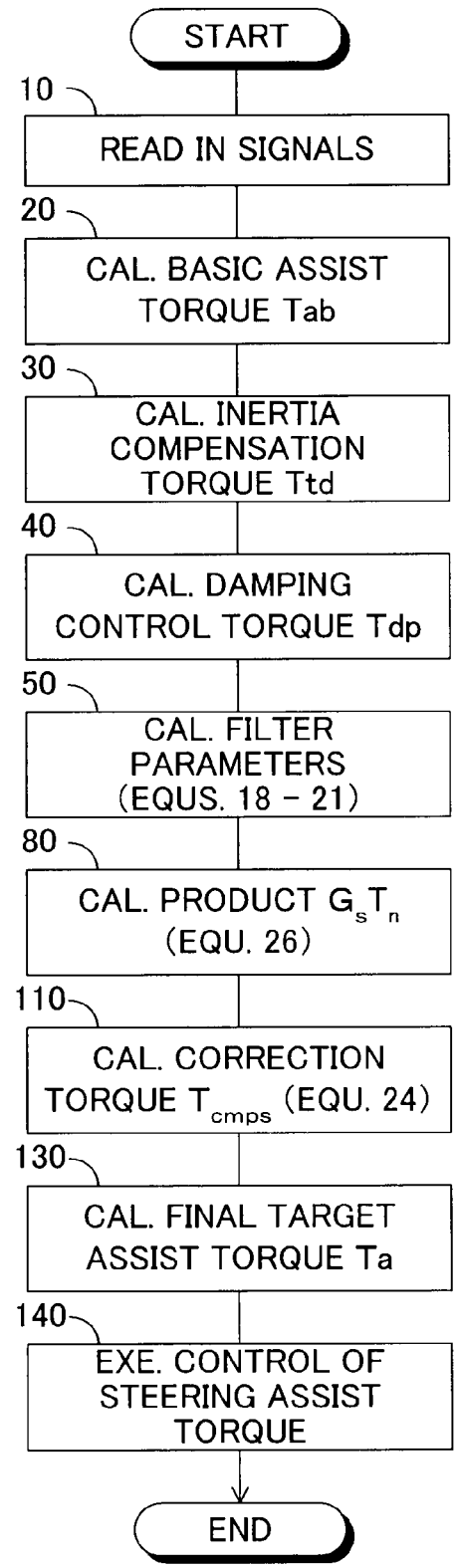
FIG. 5 is a flowchart showing an assist torque control routine in a fourth embodiment.

FIG. 5 is a flowchart showing an assist torque control routine in a fourth embodiment of an electric power steering device according to the present invention.

In this fourth embodiment, steps 10 to 50 and steps 130 and 140 are executed in the same manner as in the first embodiment and after step 50 has been completed, in step 80, a product $G_s \cdot T_n$ is calculated according to the above-described equation 24.

In step 110, a steering velocity s·θ is calculated as, for example, a time-differential value of steering angle θ and a correction torque $T_{cmps}$ is calculated according to the above-described equation 24 on the basis of vehicle speed V, the filter parameters calculated in step 50 and the product $G_s \cdot T_n$ calculated in step 80.

Thus, according to the fourth embodiment, a correction torque $T_{cmps}$ can be calculated as in the first embodiment with the exception that in step 80 a product $G_s \cdot T_n$ is calculated on the basis of vehicle speed V and a correction torque $T_{cmps}$ is calculated according to the above-described equation 24.

Fifth Embodiment

Figure 6:
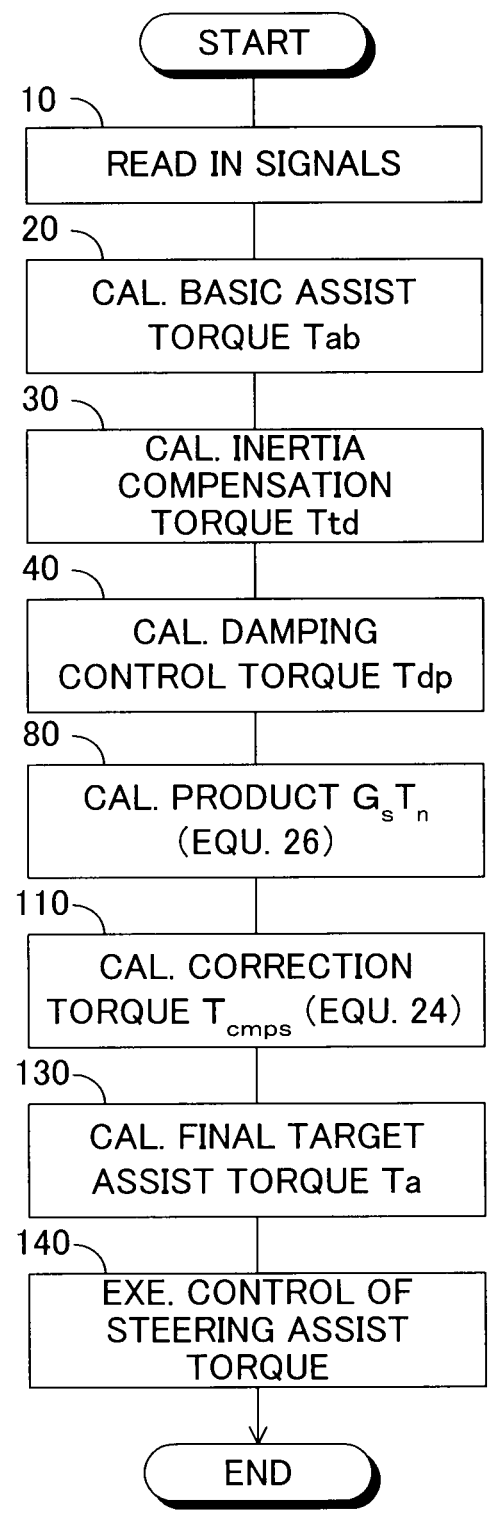
FIG. 6 is a flowchart showing an assist torque control routine in a fifth embodiment.

FIG. 6 is a flowchart showing an assist torque control routine in a fifth embodiment of an electric power steering device according to the present invention. In FIG. 6, steps similar to those appearing in FIG. 5 are denoted by like step numbers appearing in FIG. 5, and this applies to the flowchart of a sixth embodiment to be described later.

In this fifth embodiment, steps 10 to 40 and steps 110 and 140 are executed in the same manner as in the fourth embodiment and after step 40 has been completed, step 80 is executed without executing any step corresponding to step 50 in the first and fourth embodiments.

Thus, according to the fifth embodiment, a correction torque $T_{cmps}$ can be calculated as in the fourth embodiment with the exception that a step corresponding to step 50 in the first and fourth embodiments is not executed and filter parameters stored in ROM are utilized.

Sixth Embodiment

Figure 7:
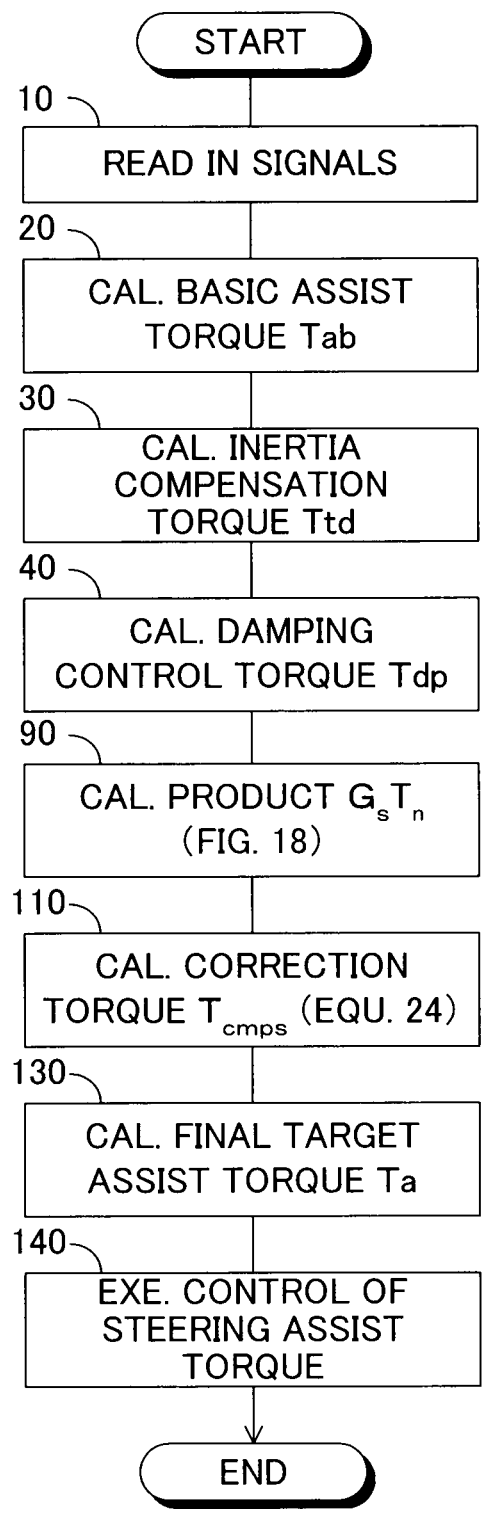
FIG. 7 is a flowchart showing an assist torque control routine in a sixth embodiment.

FIG. 7 is a flowchart showing an assist torque control routine in a sixth embodiment of an electric power steering device according to the present invention.

Figure 18:
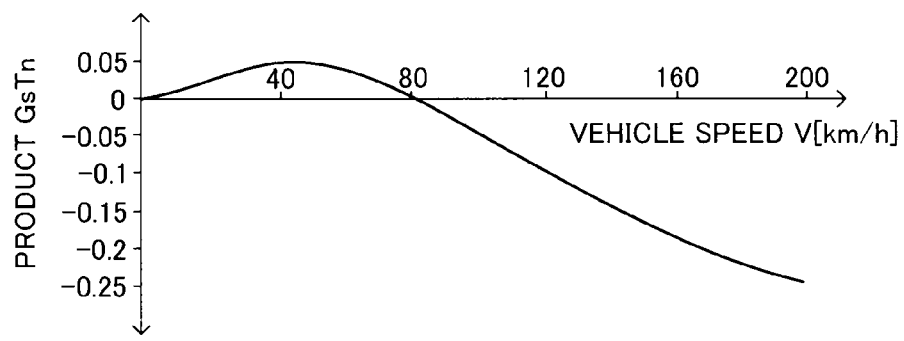
FIG. 18 is a graph showing the relationship between vehicle speed V and a product $G_s \cdot T_n$ with respect to the illustrative two-wheel model of a vehicle.
Figure 21:
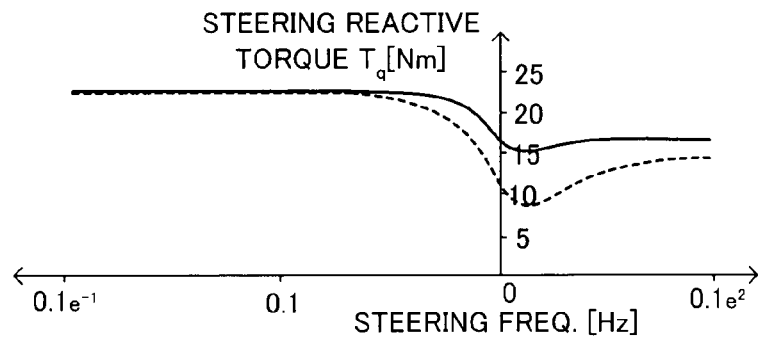
FIG. 21 is a graph showing, similar to FIG. 12, the relationship between steering frequency f (Hz) and steering reactive torque $T_q$ (Nm) for vehicle speed of 140 km/h, with respect to the case where a gain $G_s$ is calculated based on vehicle speed V of 140 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.
Figure 22:
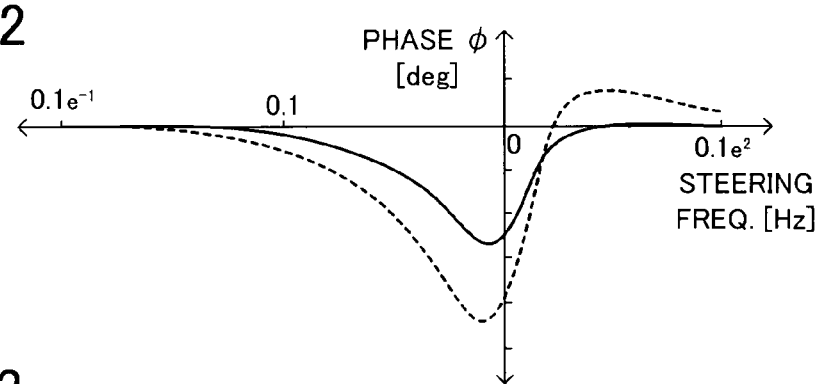
FIG. 22 is a graph showing, similar to FIG. 13, the relationship between steering frequency f (Hz) and phase φ (deg) of steering reactive torque for vehicle speed of 140 km/h, with respect to the case where a gain $G_s$ is calculated based on vehicle speed V of 140 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.
Figure 23:
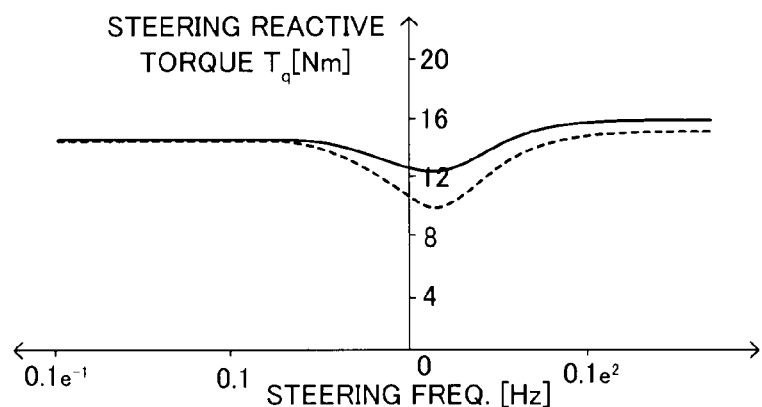
FIG. 23 is a graph showing, similar to FIG. 12, the relationship between steering frequency f (Hz) and steering reactive torque $T_q$ (Nm) for vehicle speed of 80 km/h, with respect to the case where a gain $G_s$ is calculated based on vehicle speed V of 80 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.
Figure 24:
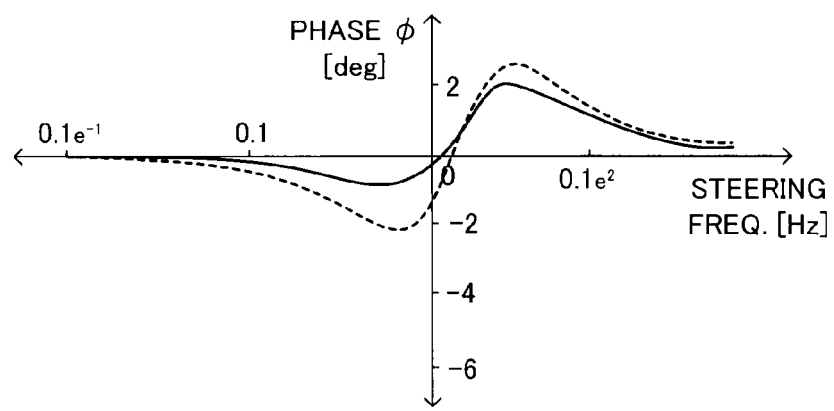
FIG. 24 is a graph showing, similar to FIG. 13, the relationship between steering frequency f (Hz) and phase φ (deg) of steering reactive torque for vehicle speed of 80 km/h, with respect to the case where a gain $G_s$ is calculated based on vehicle speed V of 80 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.
Figure 27:
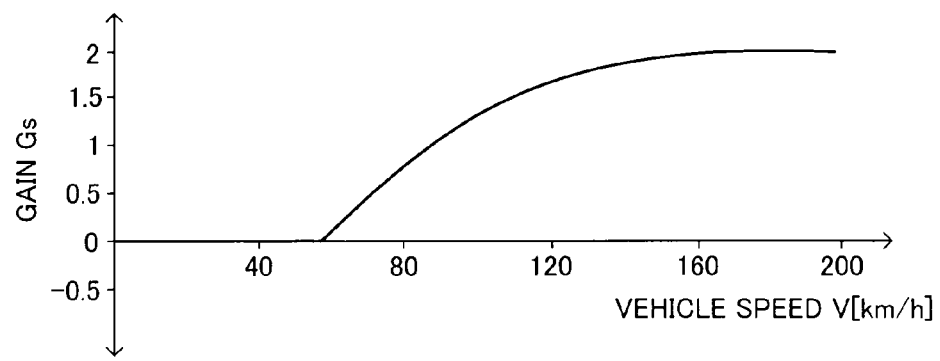
FIG. 27 is a graph showing the relationship between vehicle speed V and a gain $G_s$ for calculating a gain $G_s$.

In this sixth embodiment, steps 10 to 40 and steps 110 to 140 are executed in the same manner as in the fourth and fifth embodiments and after step 40 has been completed, in step 90, a product $G_s \cdot T_n$ is calculated on the basis of vehicle speed V according to a map corresponding to the graph shown in FIG. 18 without a step corresponding to step 50 in the first and fourth embodiments being executed.

Thus, according to the sixth embodiment, a correction torque $T_{cmps}$ can be calculated as in the fifth embodiment with the exception that a step corresponding to step 50 in the first and fourth embodiments is not executed; filter parameters stored in ROM are utilized; and a product $G_s \cdot T_n$ is calculated according to a map corresponding to the graph shown in FIG. 18.

As is understood from the above descriptions, according to the fourth to sixth embodiments, since a correction torque $T_{cmps}$ is calculated according to the above-described equation 24, it is possible to prevent the time constant of a filter from increasing to an infinite value at a specific steering velocity. Accordingly, in addition to positively and effectively suppress the variation in magnitude of steering torque which a driver feels when steering velocity changes, it is possible to positively and effectively suppress the variation in phase of steering torque which a driver feels, to thereby reduce the variation of viscous feeling that can come along with the change of steering velocity so as to positively and effectively enhance steering feeling.

Seventh Embodiment

Figure 8:
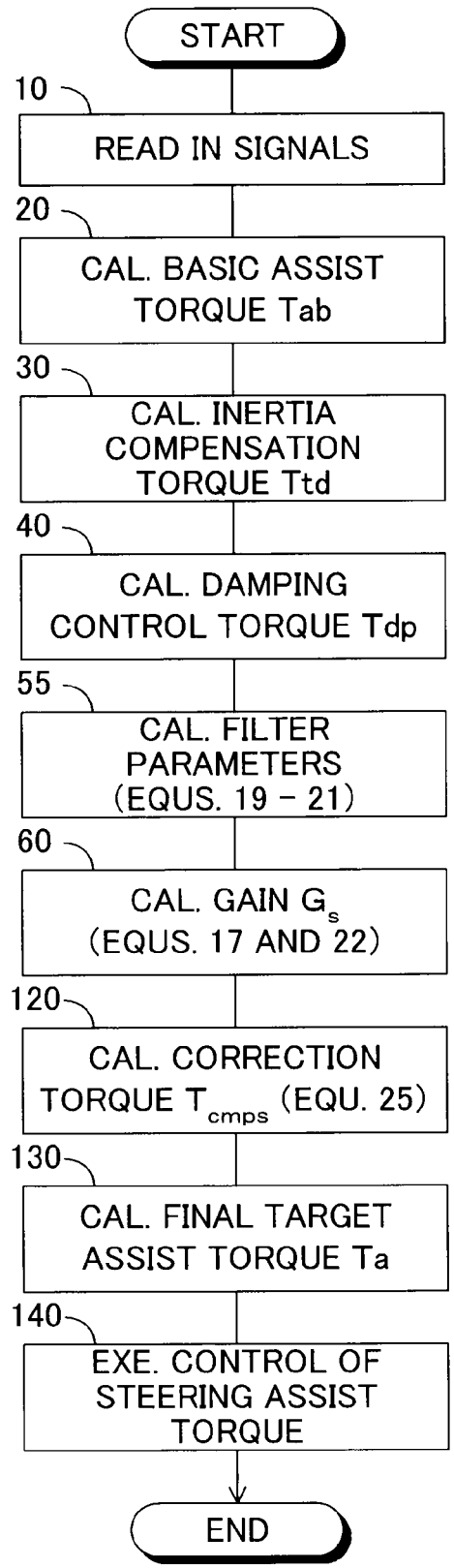
FIG. 8 is a flowchart showing an assist torque control routine in a seventh embodiment.

FIG. 8 is a flowchart showing an assist torque control routine in a seventh embodiment of an electric power steering device according to the present invention. In FIG. 8, steps similar to those appearing in FIG. 2 are denoted by like step numbers appearing in FIG. 2.

In this seventh embodiment, steps 10 to 40 and steps 60, 130 and 140 are executed in the same manner as in the first embodiment and after step 40 has been completed, in step 55, filter parameters exclusive of a time constant $T_n$ are calculated on the basis of vehicle speed V according to above-described equations 19 to 21 with normalized cornering powers $C_f$ and $C_r$ of the front and rear wheels, respectively, a mass M of the vehicle, allocation rate $D_{wf}$ of vehicle load for front wheel and the other parameter being deemed to be known constant values.

In step 120, a steering velocity $s \cdot \theta$ is calculated as a time-differential value of steering angle $\theta$ and a correction torque $T_{cmps}$ is calculated according to the above-described equation 25 on the basis of vehicle speed V, filter parameters calculated in step 55 and a gain $G_s$ calculated in step 60.

Thus, according to the seventh embodiment, a correction torque $T_{cmps}$ can be calculated as in the first embodiment with the exception that in step 55 filter parameters exclusive of a time constant $T_n$ are calculated and in step 120 a correction torque $T_{cmps}$ is calculated according to the above-described equation 25.

Eighth Embodiment

Figure 9:
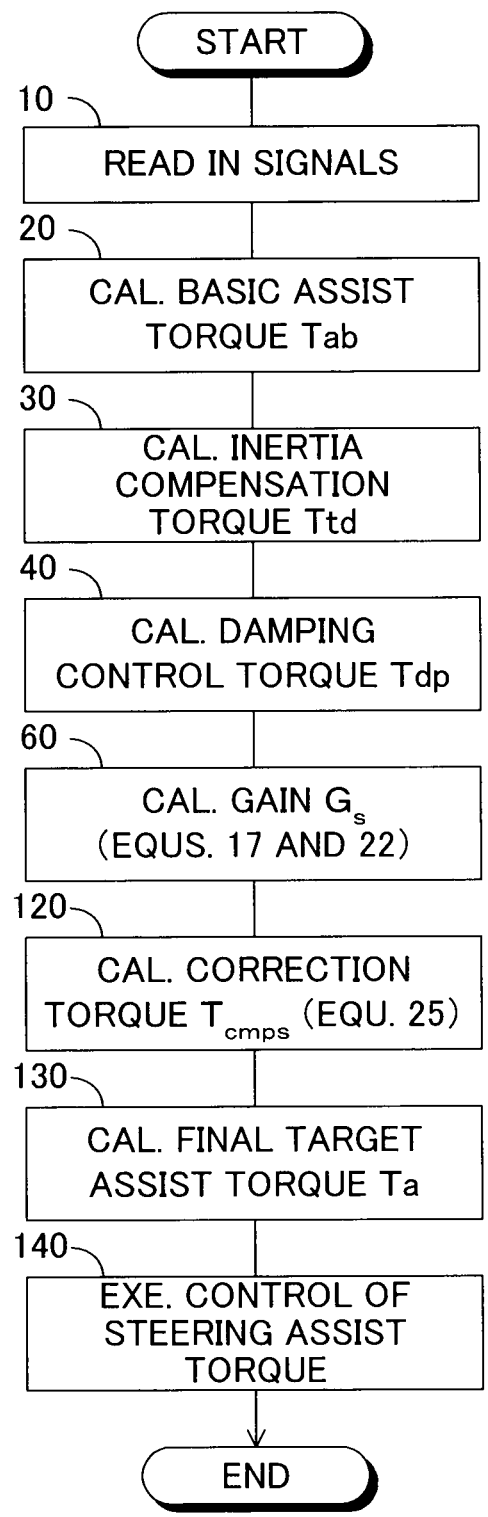
FIG. 9 is a flowchart showing an assist torque control routine in a eighth embodiment.

FIG. 9 is a flowchart showing an assist torque control routine in a eighth embodiment of an electric power steering device according to the present invention. In FIG. 9, steps similar to those appearing in FIG. 8 are denoted by like step numbers appearing in FIG. 8, and this applies to the flowchart of a ninth embodiment to be described later.

In this eighth embodiment, steps 10 to 40 and steps 60 to 140 are executed in the same manner as in the seventh embodiment and after step 40 has been completed, step 60 is executed without a step corresponding to step 55 in the seventh embodiment being executed.

Thus, according to the eighth embodiment, a correction torque $T_{cmps}$ can be calculated as in the seventh embodiment with the exception that a step corresponding to step 50 in the first and fourth embodiments is not executed and filter parameters stored in ROM are utilized.

Ninth Embodiment

Figure 10:
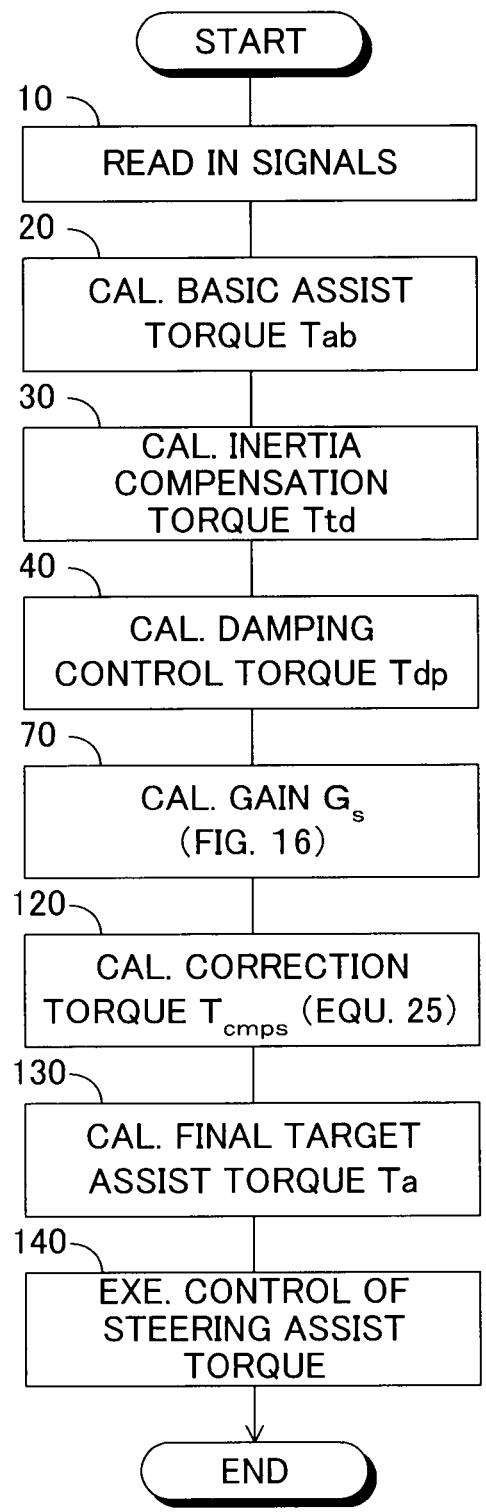
FIG. 10 is a flowchart showing an assist torque control routine in a ninth embodiment.
Figure 11:
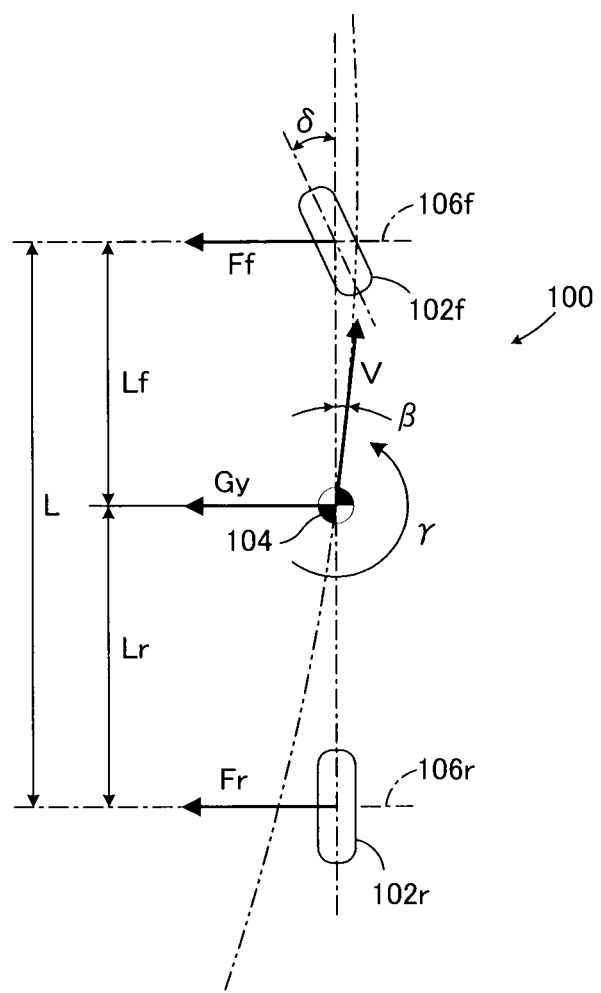
FIG. 11 is an explanatory view showing a two-wheel model of a vehicle pedal in counter-clockwise turning state.
Figure 12:
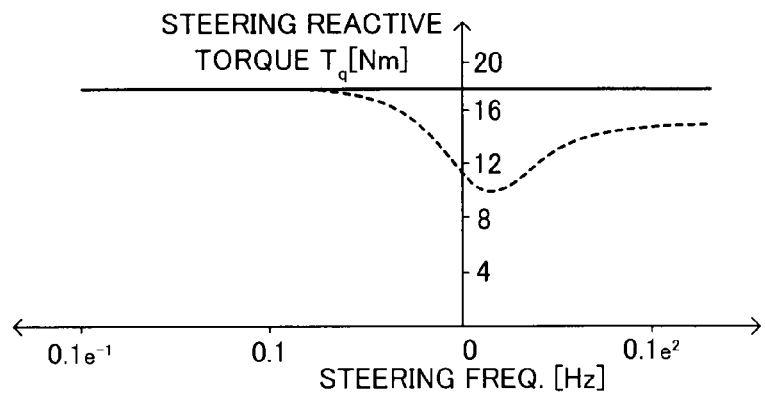
FIG. 12 is a graph showing the relationship between steering frequency f (Hz) and steering reactive torque $T_q$ (Nm) for vehicle speed of 100 km/h, with respect to the case where a target steering assist torque is not corrected with a correction torque (broken line) and the case where a target steering assist torque is corrected with a correction torque (solid line).
Figure 13:
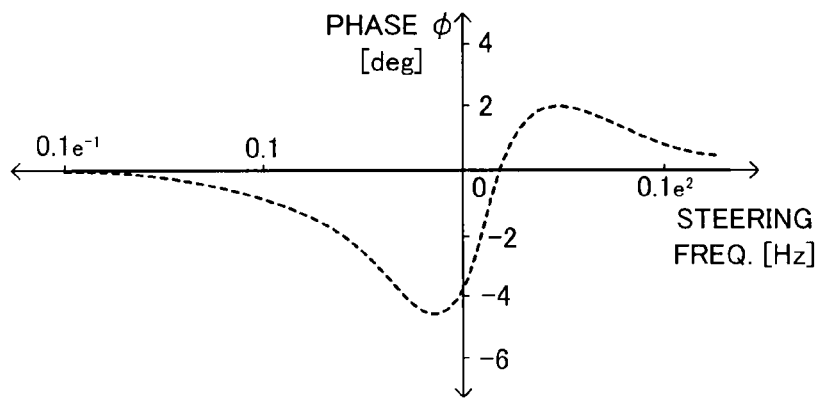
FIG. 13 is a graph showing the relationship between steering frequency f (Hz) and phase φ (deg) of steering reactive torque for vehicle speed of 100 km/h, with respect to the case where a target steering assist torque is not corrected with a correction torque (broken line) and the case where a target steering assist torque is corrected with a correction torque (solid line).
Figure 19:
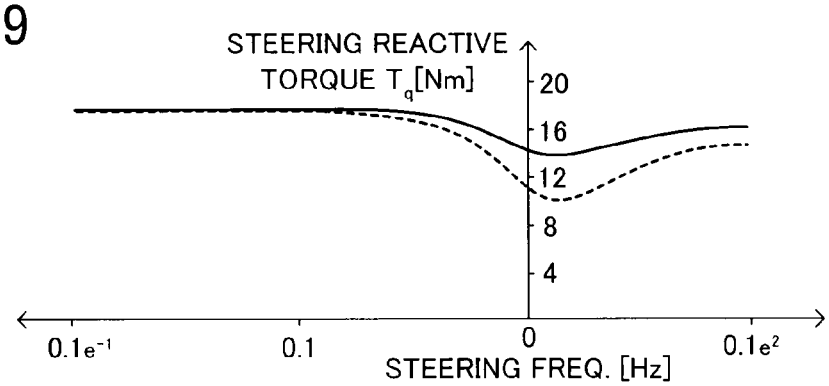
FIG. 19 is a graph showing, similar to FIG. 12, the relationship between steering frequency f (Hz) and steering reactive torque $T_q$ (Nm) for vehicle speed of 100 km/h, with respect to the case where magnitude of a gain $G_s$ is set to 50% in the illustrative two-wheel model of a vehicle.
Figure 20:
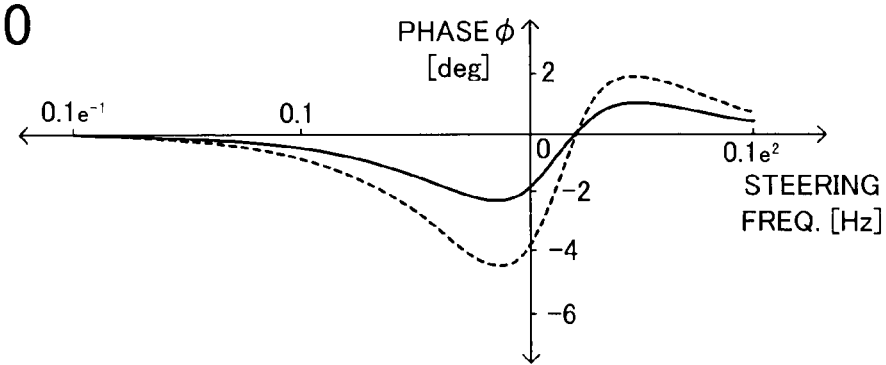
FIG. 20 is a graph showing, similar to FIG. 13, the relationship between steering frequency f (Hz) and phase φ (deg) of steering reactive torque for vehicle speed of 100 km/h, with respect to the case where magnitude of a gain $G_s$ is set to 50% in the illustrative two-wheel model of a vehicle.
Figure 14:
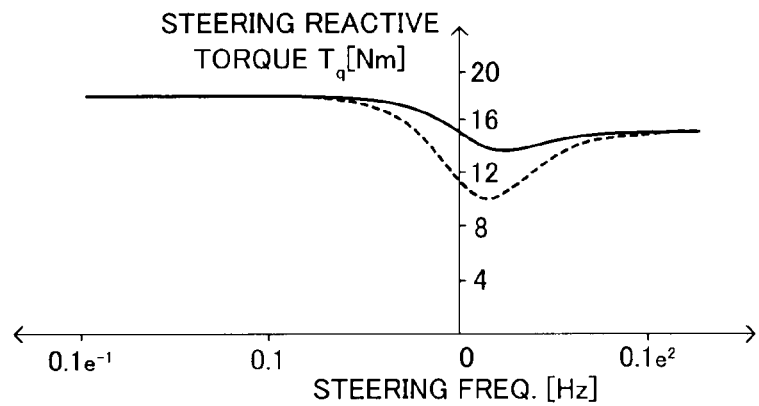
FIG. 14 is a graph showing, similar to FIG. 12, the relationship between steering frequency f (Hz) and steering reactive torque $T_q$ (Nm) with respect to the case where time constant of a filter of first-order advance is zero and vehicle speed is 100 km/h.
Figure 15:
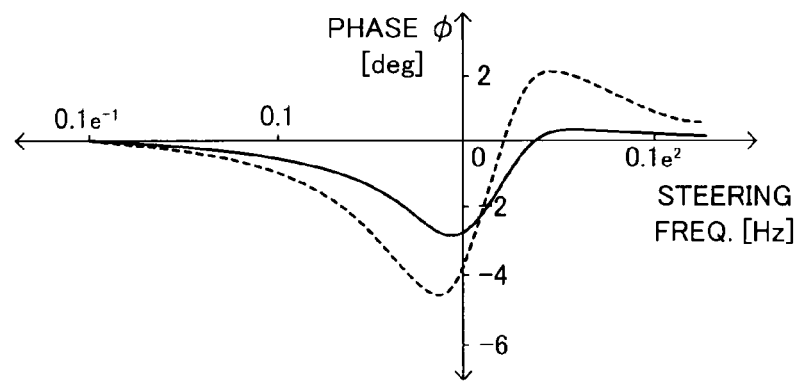
FIG. 15 is a graph showing, similar to FIG. 13, the relationship between steering frequency f (Hz) and phase φ (deg) of steering reactive torque with respect to the case where time constant of a filter of first-order advance is zero and vehicle speed is 100 km/h.
Figure 25:
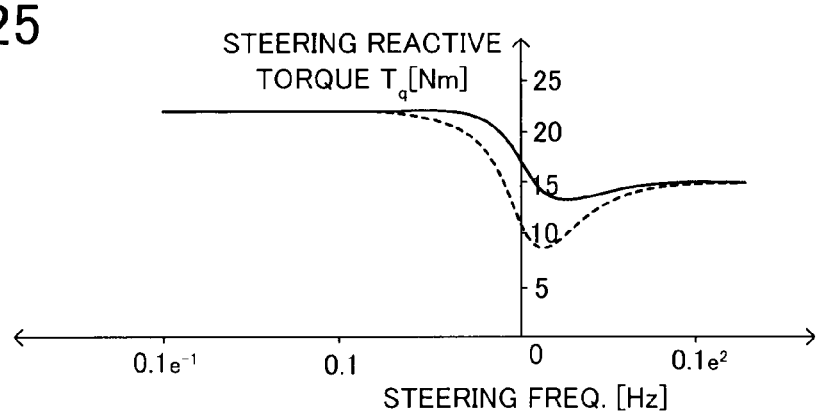
FIG. 25 is a graph showing, similar to FIG. 12, the relationship between steering frequency f (Hz) and steering reactive torque $T_q$ (Nm) for vehicle speed of 140 km/h, with respect to the case where a gain $G_s$ is calculated based on vehicle speed V of 140 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.
Figure 26:
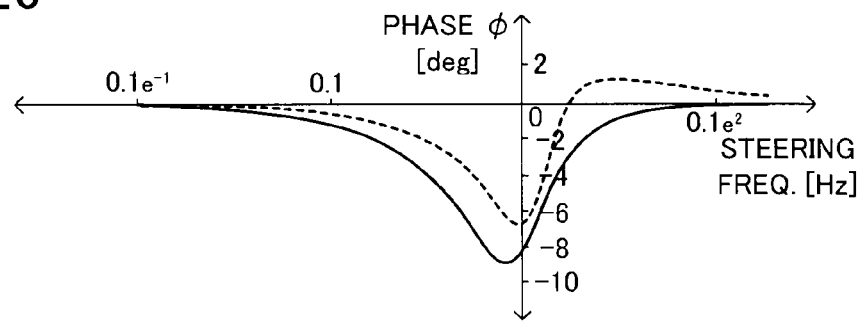
FIG. 26 is a graph showing, similar to FIG. 13, the relationship between steering frequency f (Hz) and phase φ (deg) of steering reactive torque for vehicle speed of 140 km/h, with respect to the case where a gain $G_s$ is calculated based on vehicle speed V of 140 km/h and a correction torque $T_{cmps}$ is calculated utilizing a time constant $T_n$ and filter parameters calculated in advance for vehicle speed V of 100 km/h and a gain $G_s$ in the illustrative two-wheel model of a vehicle.

FIG. 10 is a flowchart showing an assist torque control routine in a ninth embodiment of an electric power steering device according to the present invention.

In this ninth embodiment, steps 10 to 40 and steps 120 to 140 are executed in the same manner as in the seventh and eighth embodiments and after step 40 has been completed, step 70 is executed in the same manner as in the third and sixth embodiments without a step corresponding to step 55 in the seventh embodiment being executed.

Thus, according to the ninth embodiment, a correction torque $T_{cmps}$ can be calculated as in the seventh embodiment with the exception that a step corresponding to step 50 in the first and fourth embodiments is not executed; filter parameters stored in ROM are utilized; and a gain $G_s$ is calculated according to a map corresponding to the graph shown in FIG. 16.

According to the seventh to ninth embodiments, a correction torque $T_{cmps}$ is calculated according to the above-described equation 25 in step 120 and the filter utilized to calculate a correction torque $T_{cmps}$ is a filter of second-order lag having the time constant of first-order advance which is zero. Accordingly, as compared with the first to sixth embodiments where a filter of second-order lag and first-order advance is utilized, it is possible to lessen the amount of calculations which are needed to calculate a correction torque $T_{cmps}$.

According to the first, fourth and seventh embodiments, filter parameters such as a time constant $T_n$ are calculated on the basis of vehicle speed V according to the above-described equations 18 to 21 in step 50. Accordingly, as compared with a case where filter parameters are set to constant values regardless of the change of vehicle speed V, a correction torque $T_{cmps}$ can be calculated to a more appropriate value depending on vehicle speed V by conducting appropriate filtering processes according to vehicle speed V, which enables to more properly suppress the variation of steering reactive torque in magnitude and phase due to the change of steering velocity.

Also, according to the first, fourth and seventh embodiments, in calculations of filter parameters in step 50, normalized cornering powers $C_f$ and $C_r$ of the front and rear wheels, respectively, a mass M of the vehicle, allocation rate $D_{wf}$ of vehicle load for front wheel and the other parameter are deemed to be known constant values. Accordingly, as compared with a case where friction coefficient of road surface, vehicle weight and the like are detected or estimated and normalized cornering powers $C_f$ and the like are variably set according to the detected or estimated values, the amount of calculations involved can positively be reduced.

According to the first, second, seventh and eighth embodiments, a gain $G_s$ is calculated according to the above-described equations 17 and 22 in step 60. Accordingly, as compared with a case where a gain $G_s$ is set to a constant value regardless of the change of vehicle speed V, a correction torque $T_{cmps}$ can be calculated to a more appropriate value in accordance with vehicle speed V, which enables to more properly suppress the variation of steering reactive torque in magnitude and phase due to the change of steering velocity.

Also, according to the first, second, seventh and eighth embodiments, in calculations of a gain $G_s$ in step 60, normalized cornering powers $C_f$ and $C_r$ of the front and rear wheels, respectively, a mass M of the vehicle, allocation rate $D_{wf}$ of vehicle load for front wheel and the other parameter are deemed to be known constant values. Accordingly, as compared with a case where friction coefficient of road surface, vehicle weight and the like are detected or estimated and normalized cornering powers $C_f$ and the like are variably set according to the detected or estimated values, the amount of calculations involved can positively be reduced.

According to the second, third, fifth, sixth, eighth and ninth embodiments, since filter parameters are constant values, the amount of calculations involved can positively be reduced as compared with the other embodiments.

While the present invention has been described in detail with reference to the above particular embodiments, it will be apparent to those skilled in the art that the present invention is not limited thereto, but may be embodied in various other forms without departing from the scope of the invention.

For example, in the above-described embodiments, the rotation angle of the steering shaft 24 is detected as steering angle θ by a steering angle sensor 42 and steering velocity s·θ is calculated as a time-differential value of steering angle θ. However, steering velocity may be calculated in any manner known in the art. For example, it may be calculated on the basis of rotation angular velocity of the electric motor 38 or may be obtained on the basis of back electromotive force characteristics of the electric motor 38.

Figure 30:
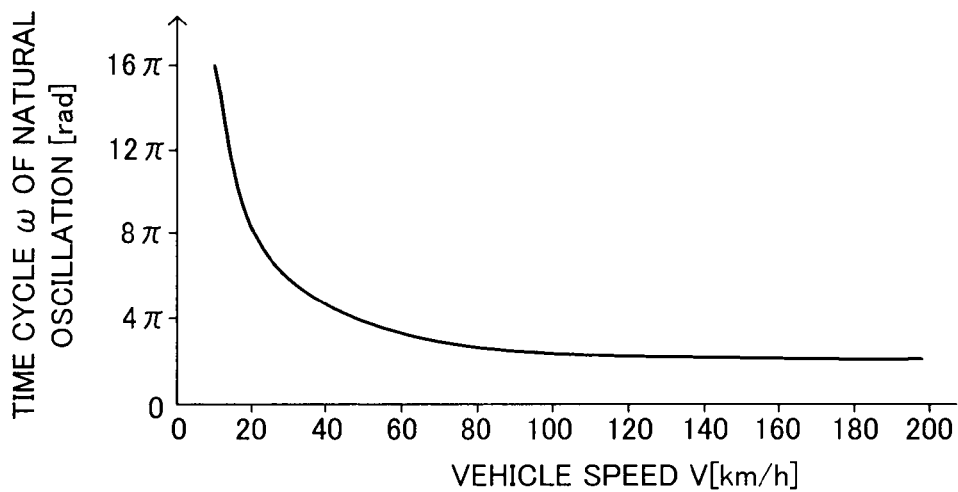
FIG. 30 is a graph showing the relationship between vehicle speed V and time cycle ω of natural oscillation.
Figure 31:
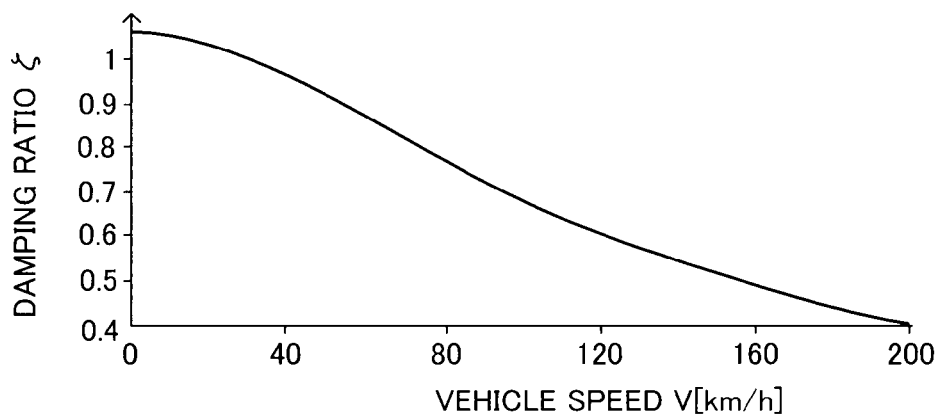
FIG. 31 is a graph showing the relationship between vehicle speed V and damping ratio ζ.

In the above-described first, fourth and seventh embodiments, filter parameters such as a time constant $T_n$ are calculated on the basis of vehicle speed V according to the above-described equations 18 to 21 in step 50. However, since the relationship shown in FIG. 30 exists between vehicle speed V and time cycle ω of natural oscillation and the relationship shown in FIG. 31 exists between vehicle speed V and damping ratio ζ, the embodiments may be modified to calculate time cycle ω of natural oscillation and damping ratio ζ on the basis of vehicle speed V according to the maps corresponding to the graphs shown in FIGS. 30 and 31, respectively.

In the above-described first, fourth and seventh embodiments, in calculations of filter parameters in step 50, normalized cornering powers $C_f$ and $C_r$ of the front and rear wheels, respectively, a mass M of the vehicle, allocation rate $D_{wf}$ of vehicle load for front wheel and the other parameter are deemed to be known constant values. In the first, second, seventh and eighth embodiments, in calculations of a gain $G_s$ in step 60, normalized cornering powers $C_f$ and $C_r$ of the front and rear wheels, respectively, a mass M of the vehicle, allocation rate $D_{wf}$ of vehicle load for front wheel and the other parameter are deemed to be known constant values. For example, however, friction coefficient μ of road surface, vehicle weight W and the like may be detected or estimated and normalized cornering powers $C_f$ and $C_r$ of the front and rear wheels, respectively, and a mass M of the vehicle may be variably set in accordance with the detected or estimated values. Allocation rate $D_{wf}$ of vehicle load for front wheel may be detected or estimated and may be set to a detected or estimated value.

Figure 32:
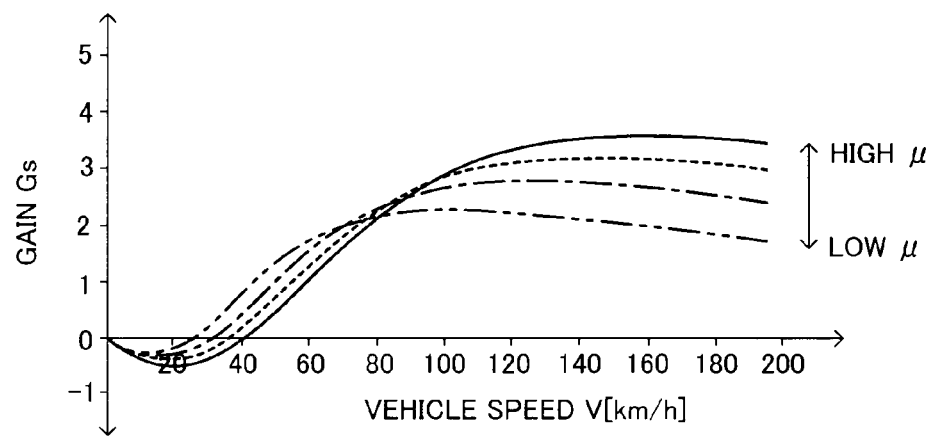
FIG. 32 is a graph showing the relationship among vehicle speed V, a gain $G_s$ and friction coefficient μ of road surface.
Figure 33:
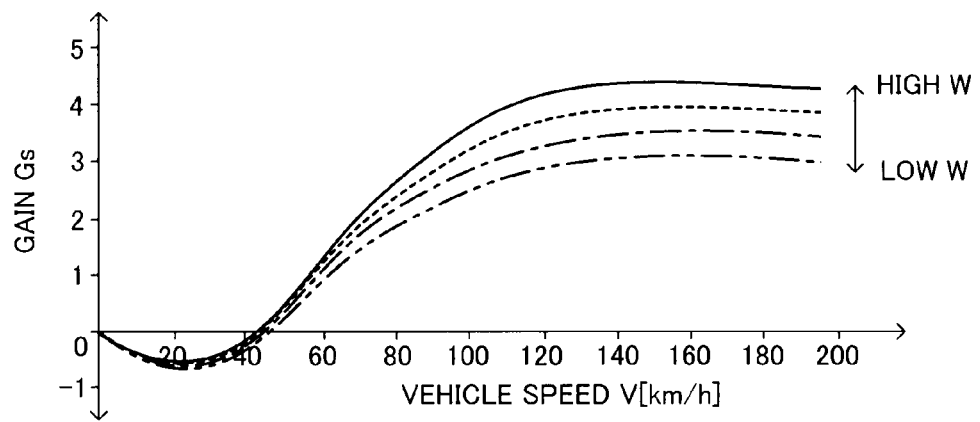
FIG. 33 is a graph showing the relationship among vehicle speed V, a gain $G_s$ and vehicle weight W.
Figure 34:
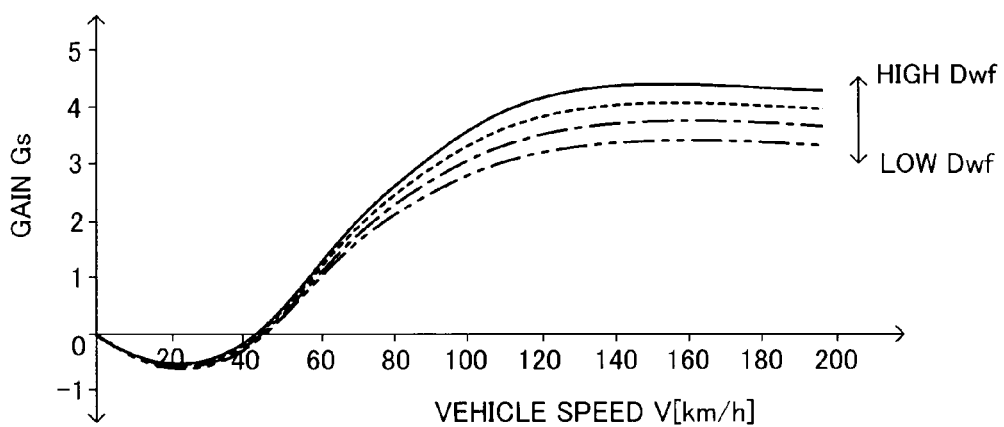
FIG. 34 is a graph showing the relationship among vehicle speed V, a gain $G_s$ and allocation rate $D_{wf}$ of vehicle load for front wheel.

In the above-described third and ninth embodiments, a gain $G_s$ is calculated according to a map corresponding to FIG. 16 in step 70. However, as shown in FIGS. 32 to 34, since the relationship between vehicle speed V and a gain $G_s$ varies depending on friction coefficient μ of road surface, vehicle weight W and allocation rate $D_{wf}$ of vehicle load for front wheel, at least one of friction coefficient μ of road surface, vehicle weight W and allocation rate $D_{wf}$ of vehicle load for front wheel may be detected or estimated and the map shown in FIG. 16 may be modified according to the detected or estimated values.

Figure 35:
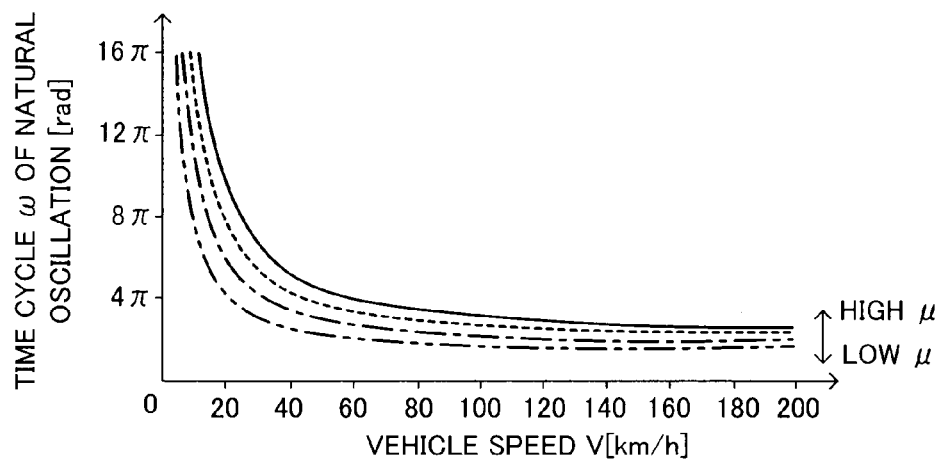
FIG. 35 is a graph showing the relationship among vehicle speed V, time cycle ω of natural oscillation and friction coefficient μ of road surface.
Figure 36:
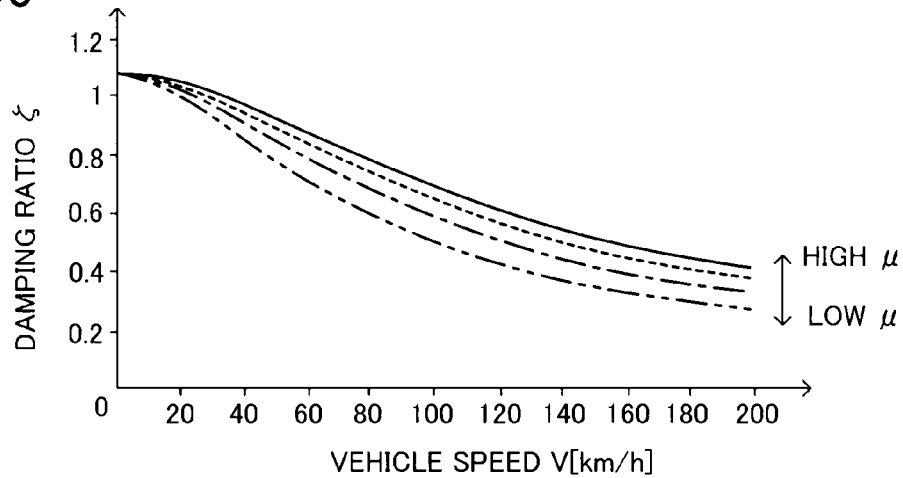
FIG. 36 is a graph showing the relationship among vehicle speed V, damping ratio ζ and friction coefficient μ of road surface.
Figure 37:
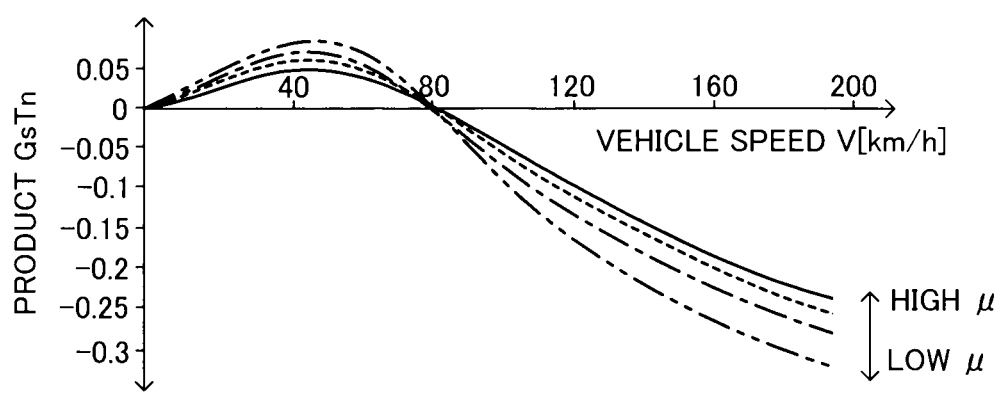
FIG. 37 is a graph showing the relationship among vehicle speed V, a product $G_s \cdot T_n$ and friction coefficient μ of road surface.

As shown in FIGS. 35 to 37, for example, the relationships between vehicle speed V and time cycle ω of natural oscillation, between vehicle speed V and damping ratio ζ, and between vehicle speed V and a product $G_s \cdot T_n$ vary depending on friction coefficient μ of road surface. Accordingly, friction coefficient μ of road surface may be detected or estimated and the maps shown in FIGS. 30, 31 and/or 29 may be modified according to the detected or estimated value.

Figure 28:
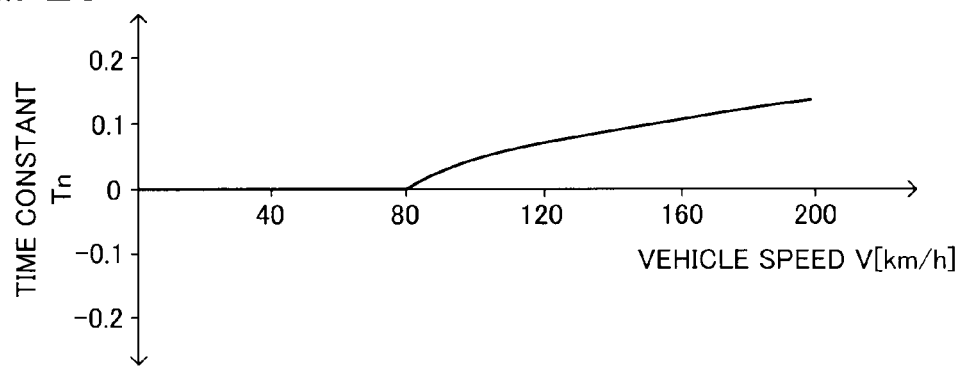
FIG. 28 is a graph showing the relationship between vehicle speed V and a time constant $T_n$ for calculating a time constant $T_n$.
Figure 29:
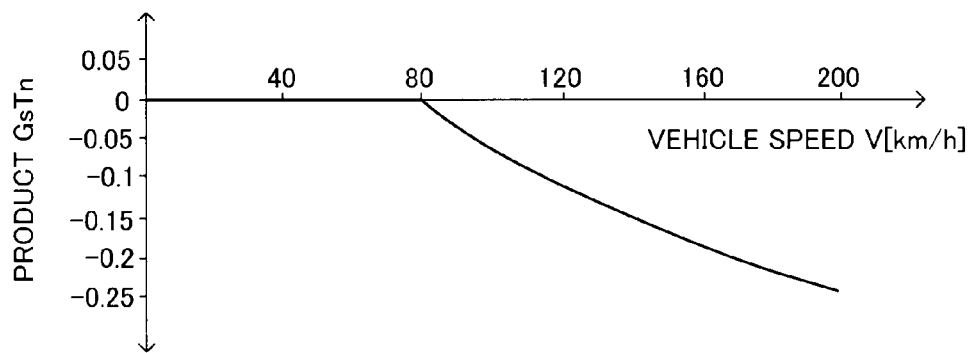
FIG. 29 is a graph showing the relationship between vehicle speed V and a product $G_s \cdot T_n$ for calculating a product $G_s \cdot T_n$.

In the second, third, eighth and ninth embodiments, filter parameters such as a time constant $T_n$ and the like are calculated for vehicle speed V of for example 100 km/h and a correction torque $T_{cmps}$ is calculated utilizing the filter parameters. However, in the above-described second and eighth embodiments, a time constant $T_n$ may be calculated according to the above-described equation 18 and in the above-described third and ninth embodiments, a time constant $T_n$ may be calculated, for example, according to the map corresponding to FIG. 28.

In the above-described embodiments, a basic assist torque Tab, an inertia compensation torque Ttd and a damping control torque Tdp are calculated in steps 20 to 40, respectively and a final target assist torque Ta is calculated by summing a basic assist torque Tab, an inertia compensation torque Ttd, a damping control torque Tdp and a correction torque $T_{cmps}$ in step 130. However, as long as a target assist torque serving as target assist force is calculated on the basis of at least steering torque, it may be calculated in any manner known in the art.

Further, in the above-described embodiments, the electric power steering device 10 imparts steering assist torque to the steering shaft 24 by the power steering actuator 20. However, the electric power steering device 10 may be adapted to impart steering assist torque or steering assist force to a member other than the steering shaft 24. For example, the electric power steering device 10 may be an electric power steering device of coaxial-with-rack type which imparts steering assist force to a rack bar. In that case, correction coefficient corresponding to a gear ratio between a pinion shaft and a rack bar is multiplied to the right-hand member in the equations 15, 16, 23, 24, and 25.

The invention claimed is:

1. An electric power steering device comprising:
    a steering input unit to be operated by a driver;
    a steering unit that is provided between said steering input unit and steered wheels and steers said steered wheels in response to a steering operation conducted by a driver with said steering input unit;
    an electric steering assist force generator to impart a steering assist force to said steering unit;
    a steering force sensor to obtain a steering force of the steering operation imparted to said steering input unit;
    a steering operation amount sensor to obtain a steering operation amount of the steering operation imparted to said steering input unit; and
    a control unit to calculate a target steering assist force in accordance with at least said steering force and to control said steering assist force generated by said steering assist force generator on the basis of said target steering assist force, and to calculate a velocity of the steering operation imparted to said steering input unit as a steering velocity, wherein
    said control unit is configured to:
        calculate a coefficient by filtering said steering velocity with a filter of second-order lag and first-order advance;
        calculate a correction amount on the basis of a product of said coefficient and said steering operation amount;
        correct said target steering assist force with said correction amount; and
        control the steering assist force generated by said steering assist force generator on the basis of the corrected target steering assist force.

2. The electric power steering device according to claim 1, wherein said control unit variably sets parameters of said filter in accordance with at least any one of vehicle speed, vehicle weight and friction coefficient of road surface.

3. The electric power steering device according to claim 2, wherein when vehicle speed is low, said control unit reduces the magnitude of said correction amount, as compared with the case where vehicle speed is high.

4. The electric power steering device according to claim 3, wherein said control unit sets said correction amount to zero when vehicle speed is not more than a reference vehicle speed.

5. The electric power steering device according to claim 1, wherein when vehicle speed is low, said control unit reduces the magnitude of said correction amount, as compared with the case where vehicle speed is high.

6. The electric power steering device according to claim 5, wherein said control unit sets said correction amount to zero when vehicle speed is not more than a reference vehicle speed.

7. An electric power steering device comprising:
    a steering input unit to be operated by a driver;
    a steering unit that is provided between said steering input unit and steered wheels and steers said steered wheels in response to a steering operation conducted by a driver with said steering input unit;
    an electric steering assist force generator to impart a steering assist force to said steering unit;
    a steering force sensor to obtain steering force of the steering operation imparted to said steering input unit;
    a steering operation amount sensor to obtain a steering operation amount of the steering operation imparted to said steering input unit; and
    a control unit to calculate a target steering assist force in accordance with at least said steering force and to control said steering assist force generated by said steering assist force generator on the basis of said target steering assist force, and to calculate a velocity of the steering operation imparted to said steering input unit as a steering velocity, wherein
    said control unit is configured to:
        calculate a coefficient by filtering said steering velocity with a filter of second-order lag and no first-order advance;
        calculate a correction amount on the basis of a product of said coefficient and said steering operation amount;
        correct said target steering assist force with said correction amount; and
        control the steering assist force generated by said steering assist force generator on the basis of the corrected target steering assist force.

8. The electric power steering device according to claim 7, wherein said control unit variably sets parameters of said filter in accordance with at least any one of vehicle speed, vehicle weight and friction coefficient of road surface.

9. The electric power steering device according to claim 7, wherein when vehicle speed is low, said control unit reduces the magnitude of said correction amount, as compared with the case where vehicle speed is high.

10. The electric power steering device according to claim 9, wherein said control unit sets said correction amount to zero when vehicle speed is not more than a reference vehicle speed.

* * * * *